(12) United States Patent
Yoon

(10) Patent No.: US 12,086,633 B2
(45) Date of Patent: *Sep. 10, 2024

(54) NEURAL PROCESSING DEVICE AND METHOD FOR JOB SCHEDULING THEREOF

(71) Applicant: Rebellions Inc., Seongnam-si (KR)

(72) Inventor: Seokju Yoon, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,682

(22) Filed: Oct. 26, 2023

(65) Prior Publication Data
US 2024/0061707 A1 Feb. 22, 2024

Related U.S. Application Data

(63) Continuation of application No. 18/312,490, filed on May 4, 2023, now Pat. No. 11,861,401.

(30) Foreign Application Priority Data

May 25, 2022 (KR) .......................... 10-2022-0064112
Dec. 15, 2022 (KR) .......................... 10-2022-0176341

(51) Int. Cl.
*G06F 9/48* (2006.01)
*G06F 9/54* (2006.01)

(52) U.S. Cl.
CPC ............ *G06F 9/4881* (2013.01); *G06F 9/544* (2013.01)

(58) Field of Classification Search
CPC .............................. G06F 9/4881; G06F 9/544
See application file for complete search history.

(56) References Cited

U.S. PATENT DOCUMENTS 7,698,541 B1   4/2010 Robles

FOREIGN PATENT DOCUMENTS

| JP | 2021-43814 A | 3/2021 |
|---|---|---|
| KR | 10-2019-0116040 A | 10/2019 |
| KR | 10-2020-0133165 A | 11/2020 |
| KR | 10-2191408 B1 | 12/2020 |
| KR | 10-2258566 B1 | 5/2021 |
| KR | 10-2021-0076882 A | 6/2021 |

*Primary Examiner* — Wissam Rashid
(74) *Attorney, Agent, or Firm* — BROADVIEW IP LAW, PC

(57) ABSTRACT

A neural processing device and a method for job scheduling are provided. The neural processing device configured to receive, by an address space ID (ASID) manager, first and second requests from at least one context, respectively, and determine whether ASIDs are allocated, store jobs of contexts to which the ASIDs have not been allocated from the ASID manager in entities, schedule, by a job scheduler, an execution order of the jobs stored in the entities and cause the ASID manager to allocate the ASIDs to the contexts to which the ASIDs have not been allocated among the at least one context, and sequentially receive, by a command queue, jobs of contexts to which the ASIDs have been allocated, store the jobs as standby jobs, and sequentially execute the standby jobs.

20 Claims, 29 Drawing Sheets

NEURAL PROCESSING DEVICE AND METHOD FOR JOB SCHEDULING THEREOF

CROSS-REFERENCE TO RELATED APPLICATIONS

This application is a continuation of U.S. application Ser. No. 18/312,490, filed on May 4, 2023, which claims priority under 35 U.S.C § 119 to Korean Patent Application No. 10-2022-0064112 on May 25, 2022, now KR Patent No. 10-2480300 registered on Dec. 19, 2022, and Korean Patent Application No. 10-2022-0176341 filed on Dec. 15, 2022, in the Korean Intellectual Property Office, the entire contents of which are hereby incorporated by reference.

TECHNICAL FIELD

The disclosure relates to a neural processing device and a method for job scheduling thereof. More particularly, the disclosure relates to a neural processing device that maximizes job scheduling efficiency and a method for job scheduling thereof.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

The neural processing units perform jobs according to various contexts and perform the scheduling of such jobs. In this case, the scheduling of jobs can cause latencies while passing through various stages of software and hardware, and thus reduce the efficiency of the whole unit.

The description set forth in the background section should not be assumed to be prior art merely because it is set forth in the background section. The background section may describe aspects or embodiments of the disclosure.

SUMMARY

Aspects of the disclosure provide a neural processing device that minimizes the latency of job scheduling.

Aspects of the disclosure provide a method for job scheduling of a neural processing device that minimizes the latency of job scheduling.

According to some aspects of the disclosure, a neural processing device including at least one neural processor, a shared memory shared by the at least one neural processor, and a global interconnection configured to exchange data between the at least one neural processor and the shared memory, configured to receive, by an address space ID (ASID) manager, first and second requests from at least one context, respectively, and determine whether ASIDs are allocated, store jobs of contexts to which the ASIDs have not been allocated from the ASID manager in entities, schedule, by a job scheduler, an execution order of the jobs stored in the entities and cause the ASID manager to allocate the ASIDs to the contexts to which the ASIDs have not been allocated among the at least one context, and sequentially receive, a command queue, jobs of contexts to which the ASIDs have been allocated, store the jobs as standby jobs, and sequentially execute the standby jobs, wherein the standby jobs comprise a first job transmitted directly without going through the job scheduler and a second job transmitted through an allocation procedure of the ASIDs by the job scheduler.

According to some aspects, the at least one context comprises first and second contexts, the first context is allocated a first ASID from the ASID manager, the second context is not allocated any of the ASIDs from the ASID manager and then is allocated one of the ASIDs by the job scheduler, and the first and second contexts perform the first and second jobs, respectively.

According to some aspects, the at least one context further comprises a third context, and the third context is allocated a second ASID from the ASID manager.

According to some aspects, the at least one context further comprises a fourth context, the entities comprise first and second entities, the first entity receives the second job from the second context, and the second entity receives a third job from the fourth context.

According to some aspects, the job scheduler schedules jobs stored in the first and second entities and thereby allocates the jobs to the command queue.

According to some aspects, the ASID manager provides a pass-through route and a non-pass-through route, the pass-through route is a path to which the ASID manager directly allocates the first and second ASIDs, and the non-pass-through route is a path to which the ASID manager does not directly allocate an ASID and then the job scheduler allocates an ASID.

According to some aspects, the job scheduler requests allocation of one or more currently unbound ASID to the ASID manager.

According to some aspects, the second context wakes up the job scheduler by pushing the second job, the job scheduler transfers the second job to the command queue by emitting the second job, and the neural processing device executes the second job.

According to some aspects, there exists a first scheduling overhead between a time point at which the second context pushes the second job and a time point before the job scheduler emits the second job.

According to some aspects, there exists a second scheduling overhead between a time point when the job scheduler emits the second job and a time point before the neural processing device executes the second job.

According to some aspects, the first context transfers the first job to the neural processing device without a scheduling overhead, and the neural processing device executes the first job.

According to some aspects, the at least one context comprises first and second contexts, the first context is allocated a first ASID from the ASID manager, and the ASID manager unbinds the first ASID when the first job is executed.

According to some aspects, the second context is not allocated one of the ASIDs from the ASID manager, and then is allocated one of unbound ASIDs from the ASID manager according to a request of the job scheduler.

According to some aspects, the ASID manager allocates an LRU (least recently used) ASID that has not been used for a longest time among the unbound ASIDs to the second context.

According to some aspects of the disclosure, a method for job scheduling of a neural processing device, comprises receiving, by an ASID manager, an ASID allocation request from a first context, determining, by the ASID manager, whether there is any unbound ASID among ASIDs, if there is an unbound ASID, allocating the unbound ASID to the first context, and providing, by the first context, a first job to be executed by the first context directly to a command queue.

According to some aspects, the method for job scheduling of the neural processing device, further comprises if there is no unbound ASID, providing, by the first context, the first job to a first entity, allocating, by a job scheduler, an ASID to the first context via the ASID manager, and providing, by the job scheduler, the first job to the command queue via the ASID.

According to some aspects, the method for job scheduling of the neural processing device, further comprises executing, by the neural processing device, the first job provided to the command queue.

According to some aspects, the neural processing device comprises at least one neural processor and a shared memory shared by the at least one neural processor.

According to some aspects, allocating the unbound ASID comprises selecting unbound ASIDs among the ASIDs, choosing an LRU ASID that is an oldest previously used among the unbound ASIDs, and allocating the LRU ASID to the first context.

According to some aspects, allocating the unbound ASID further comprises the job scheduler sequentially allocating the ASIDs.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The processing element, the neural processing device including the same, and the method for job scheduling thereof of the disclosure can eliminate the wake-up overhead of the job scheduler as the contexts can directly access the command queue regardless of the job scheduler.

Further, it is also possible to eliminate the wake-up overhead of hardware in the job scheduler.

In addition to the foregoing, the specific effects of the disclosure will be described together while elucidating the specific details for carrying out the embodiments below.

DETAILED DESCRIPTION OF THE PREFERRED EMBODIMENTS

Figure 1:
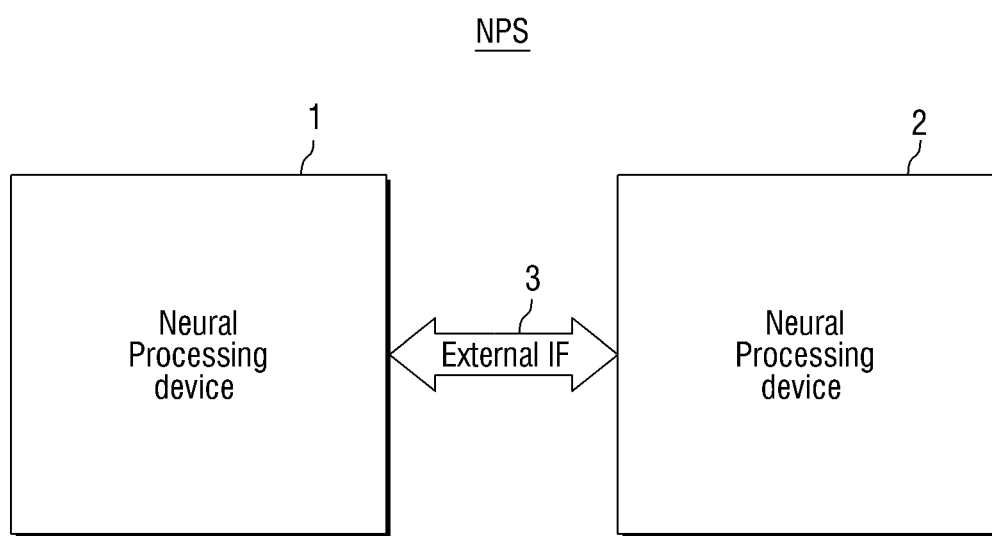
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 27.

FIG. 1 is a block diagram for illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

Figure 2:
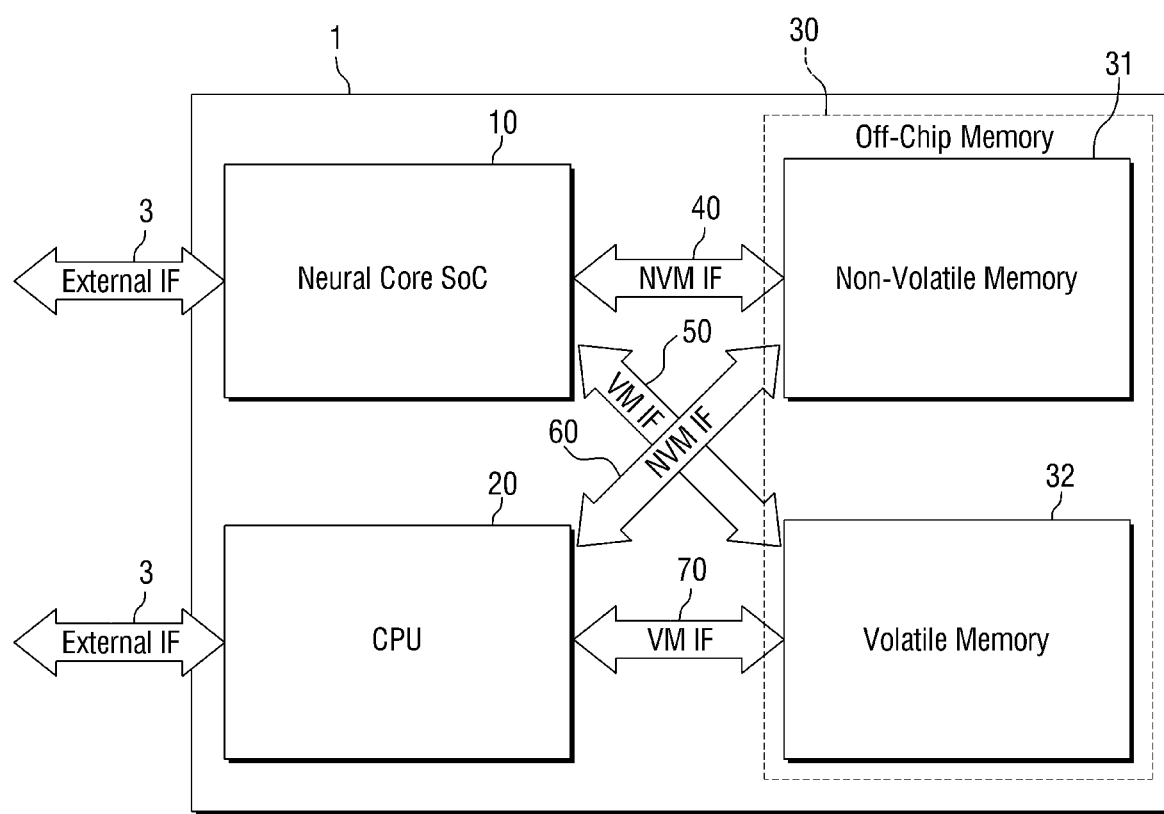
FIG. 2 is a block diagram for illustrating the neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
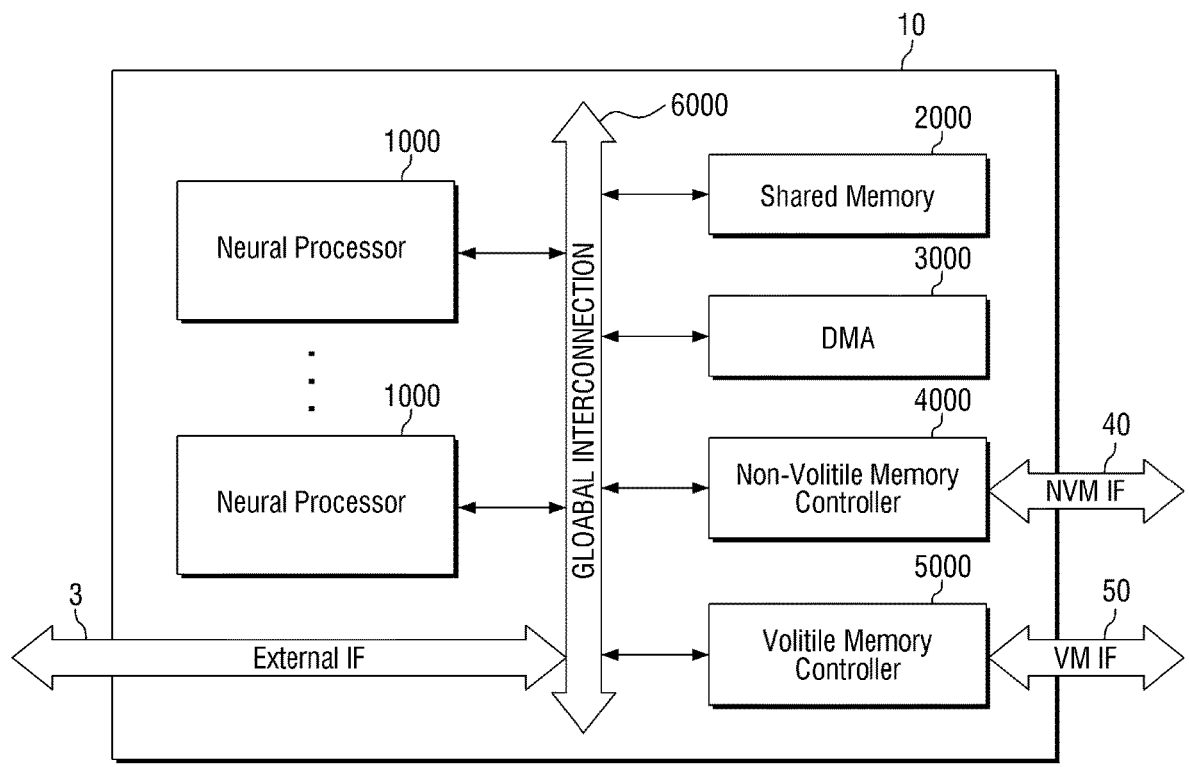
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 3 (L3). Accordingly, the shared memory 2000 may also be defined as an L3 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked and/or coordinated via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

Figure 4:
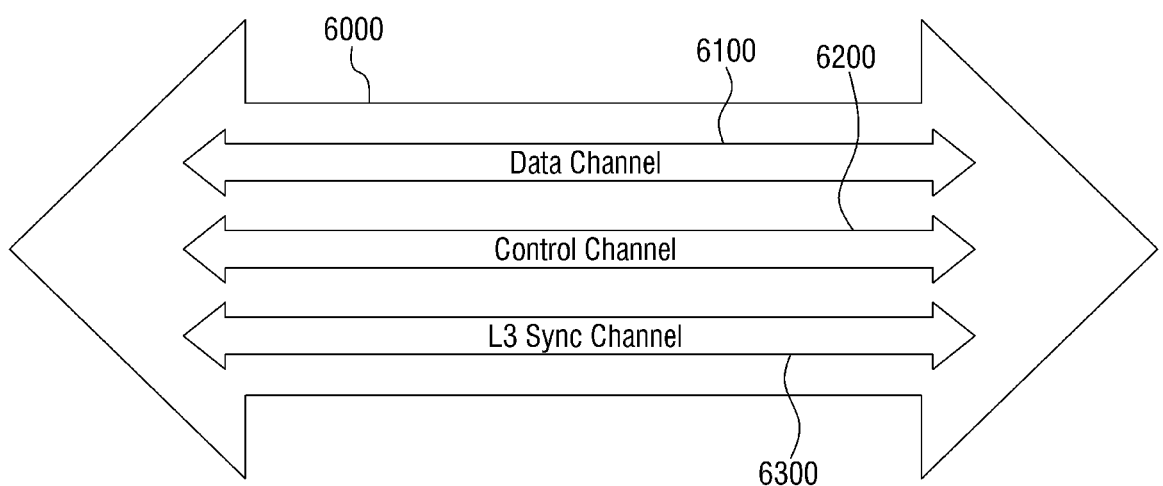
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L3 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L3 sync channel 6300 may be a dedicated channel for transmitting synchronization signals. Through the L3 sync channel 6300, the at least one neural processor 1000, the shared memory 2000, the DMA 3000, the non-volatile memory controller 4000, the volatile memory controller 5000, and the external interface 3 may exchange synchronization signals with one another.

The L3 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
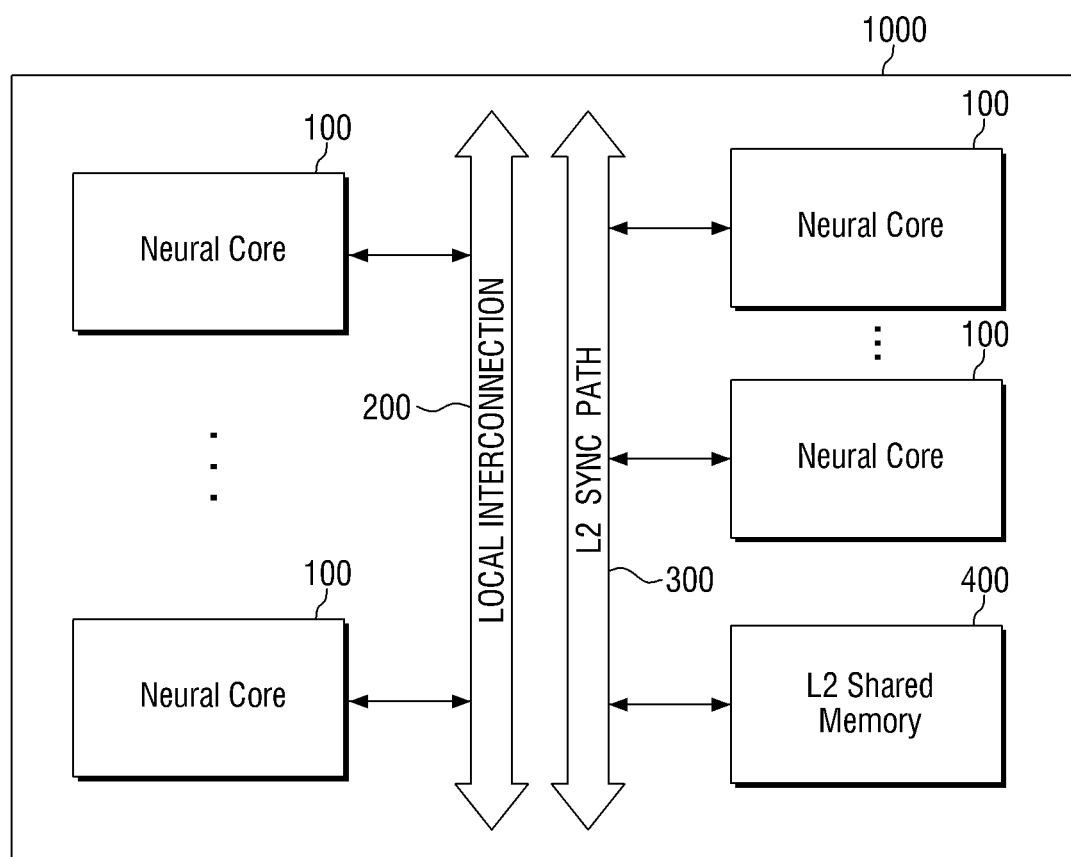
FIG. 5 is a block diagram for illustrating the neural processor of FIG. 3.

FIG. 5 is a block diagram for illustrating the neural processor of FIG. 3.

Referring to FIGS. 3 to 5, a neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, various embodiments are not limited thereto. FIG. 5 illustrates that a plurality of neural cores are included in the neural processor 1000, but various embodiments are not limited thereto. That is, the neural processor 1000 may be configured with only one neural core.

The L2 shared memory 400 may be a memory shared by the neural cores 100 in the neural processor 1000. The L2 shared memory 400 may store data of each neural core 100. In addition, the L2 shared memory 400 may receive data from the shared memory 2000 of FIG. 3, store them temporarily, and transfer them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 6000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 6000. In such a case, the L2 sync path 300 may be formed separately so that the synchronization signal can be transmitted quickly and without any delay. The L2 sync path 300 may be used for synchronization performed at a level one step lower than that of the L3 sync channel 6300 of the global interconnection 6000.

Figure 6:
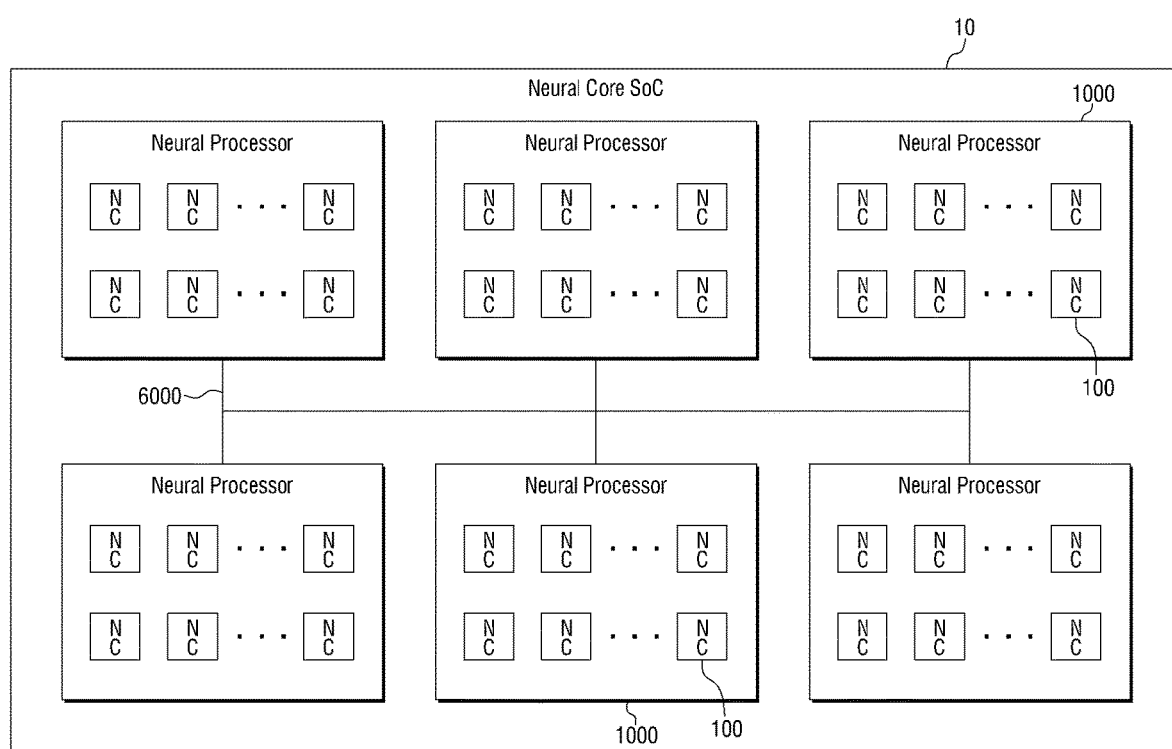
FIG. 6 is a diagram for illustrating a hierarchical structure of a neural processing device in accordance with some embodiments of the disclosure.

FIG. 6 is a diagram for illustrating a hierarchical structure of a neural processing device in accordance with some embodiments of the disclosure.

Referring to FIG. 6, the neural core SoC 10 may include at least one neural processor 1000. Each neural processor 1000 may transmit data to each other via the global interconnection 6000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the embodiment may configure the scales of the minimum calculation unit, considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the rapid scheduling and efficient execution of calculation tasks without wasting hardware resources.

Figure 7:
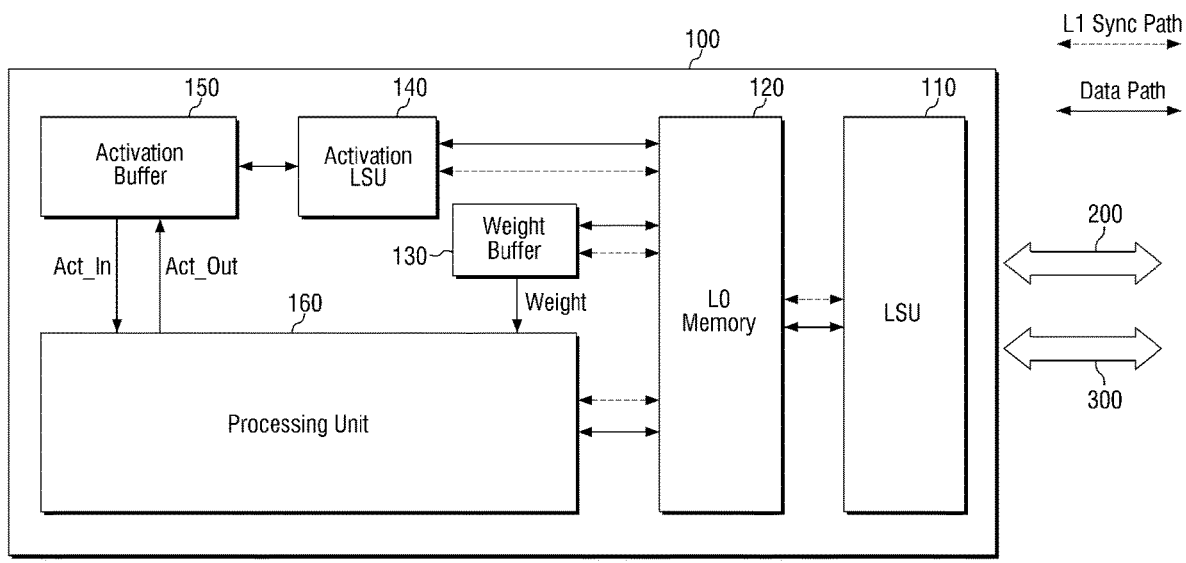
FIG. 7 is a block diagram for illustrating the neural core of FIG. 5 in detail.

FIG. 7 is a block diagram for illustrating the neural core of FIG. 5 in detail.

Referring to FIG. 7, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L2 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L2 sync path 300. In this case, the LSU 110 may be referred to as an LSU circuit, but for the sake of convenience, the terms are unified as an LSU. In addition, the LSU 110 may be implemented as a circuit or circuitry.

Figure 8:
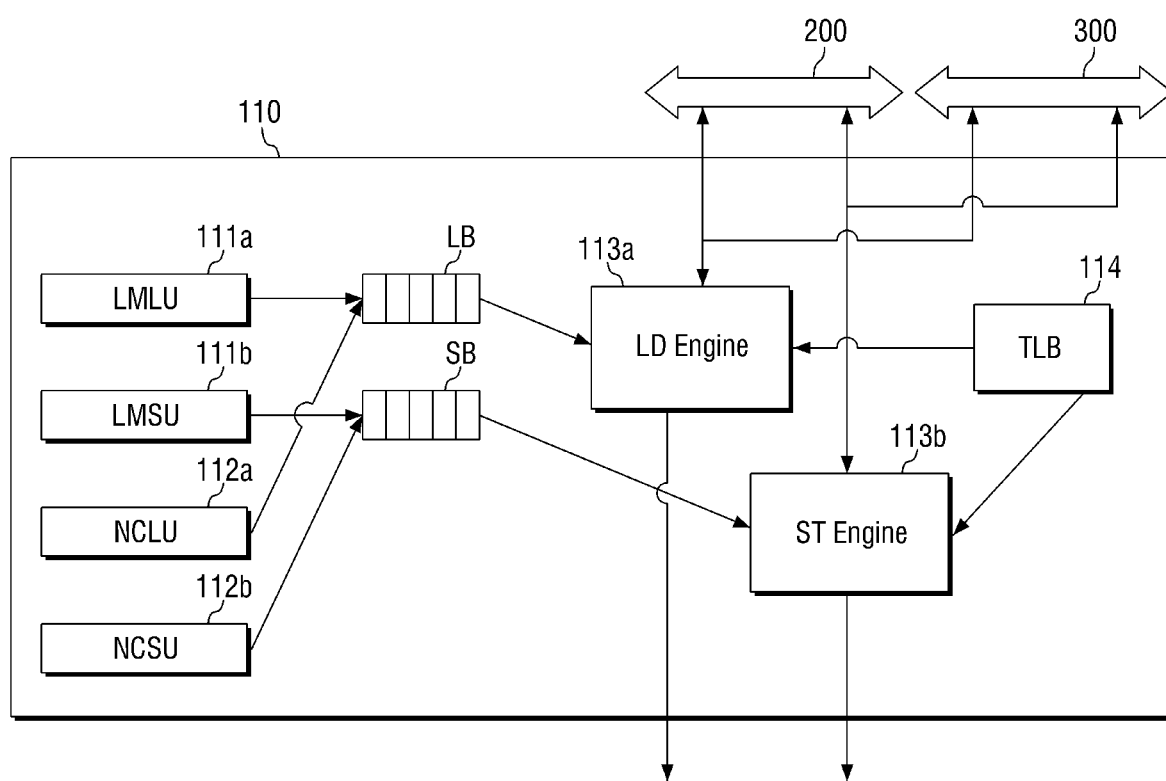
FIG. 8 is a block diagram for illustrating the LSU of FIG. 7 in detail.

FIG. 8 is a block diagram for illustrating the LSU of FIG. 7.

Referring to FIG. 8, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signal may indicate that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a processing element (PE) array 163 and a vector unit 164. The L0 memory 120 may be a memory corresponding to the level of the neural core. In this case, the L0 memory 120 may be a private memory of the neural core that is not shared.

The L0 memory 120 may transmit data such as activations or weights via a data path. The L0 memory 120 may exchange synchronization signals via an L1 sync path, which is a separate dedicated path. The L0 memory 120 may exchange synchronization signals with, for example, the LSU 110, the weight buffer 130, the activation LSU 140, and the processing unit 160 via the L1 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
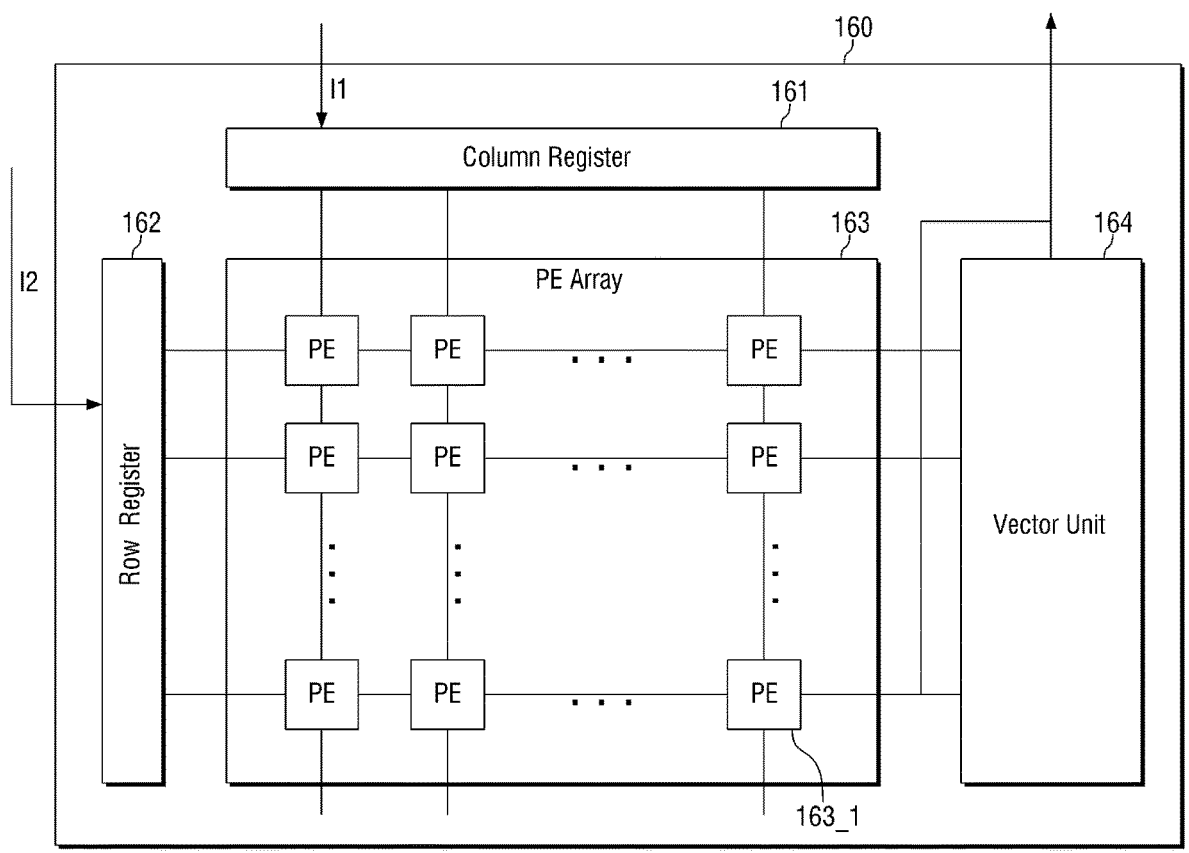
FIG. 9 is a block diagram for illustrating the processing unit of FIG. 7.

FIG. 9 is a block diagram for illustrating the processing unit of FIG. 7 in detail.

Referring to FIG. 7 and FIG. 9, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 10:
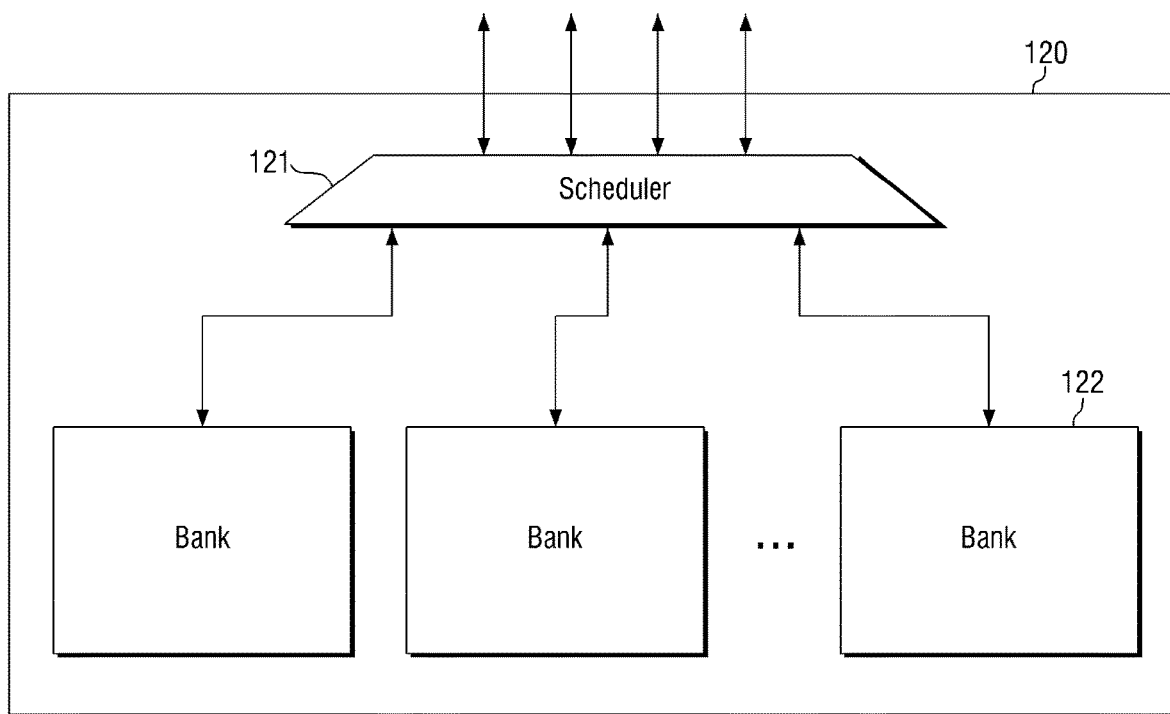
FIG. 10 is a block diagram for illustrating the L0 memory of FIG. 7 in detail.

FIG. 10 is a block diagram for illustrating the L0 memory of FIG. 7 in detail.

Referring to FIG. 10, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In this case, the scheduler 121 may be referred to as a scheduler circuit, but for the sake of convenience, the term is unified as a scheduler. In addition, the scheduler 121 may be implemented as a circuit or circuitry.

Figure 11:
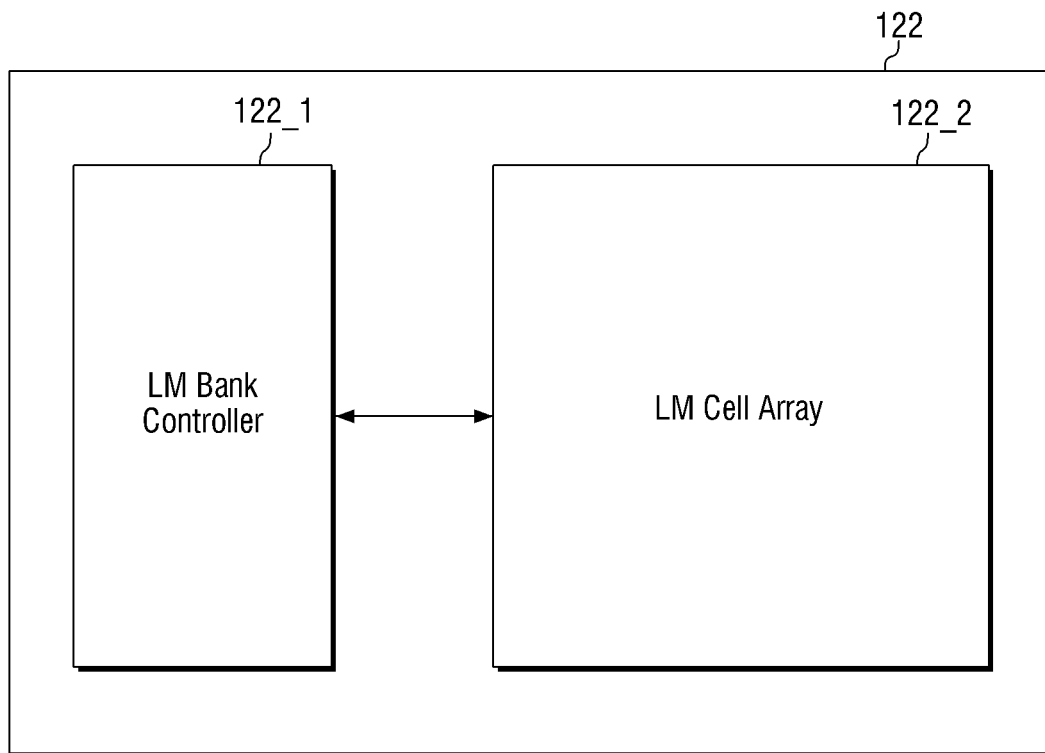
FIG. 11 is a block diagram for illustrating the local memory bank of FIG. 10.

FIG. 11 is a block diagram for illustrating the local memory bank of FIG. 10 in detail.

Referring to FIG. 11, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 12:
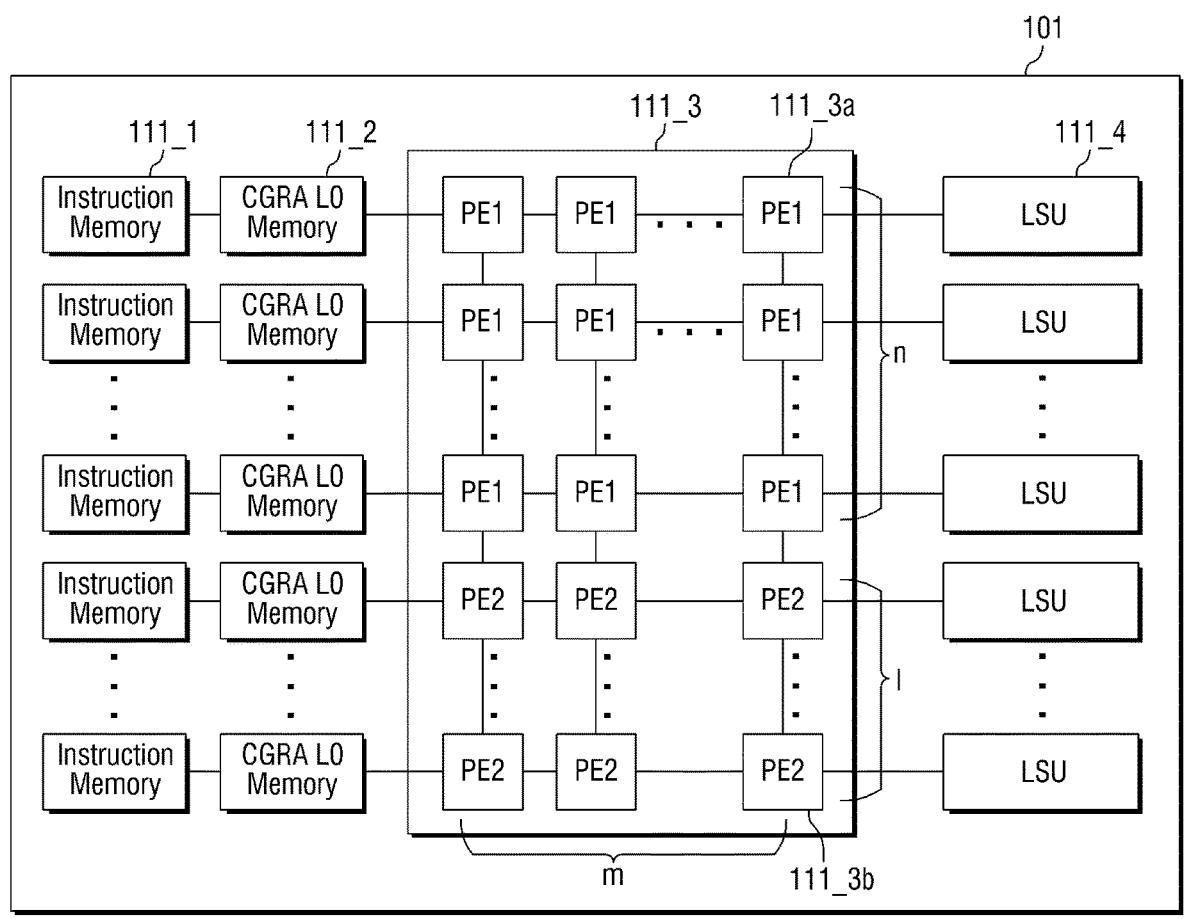
FIG. 12 is a block diagram for illustrating the structure of the neural processing device of FIG. 1 in detail.

FIG. 12 is a block diagram for illustrating in detail the structure of the neural processing device in accordance with some embodiments of the disclosure.

Referring to FIG. 12, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may transmit and receive data to and from the PE array 111_3. The CGRA L0 memory 111_2 may correspond to L0 (a level 0) lower than L1. In this case, the L0 memory may be a private unshared memory of the neural core 101 unlike the L2 shared memory 400. The CGRA L0 memory 111_2 may transmit a program and data, such as activation or weight, to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside through the local interconnection 200. The LSU 111_4 may transmit at least one of the received data, the received control signal, or the received synchronization signal to the CGRA L0 memory 111_2. Similarly, the LSU 111_4 may transmit at least one of data, a control signal, or a synchronization signal to the outside through the local interconnection 200. The LSU 111_4 may be referred to as an LSU circuit, but for the sake of convenience, the terms are unified as an LSU. In addition, the LSU 111_4 may be implemented as a circuit or circuitry.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In other words, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 13:
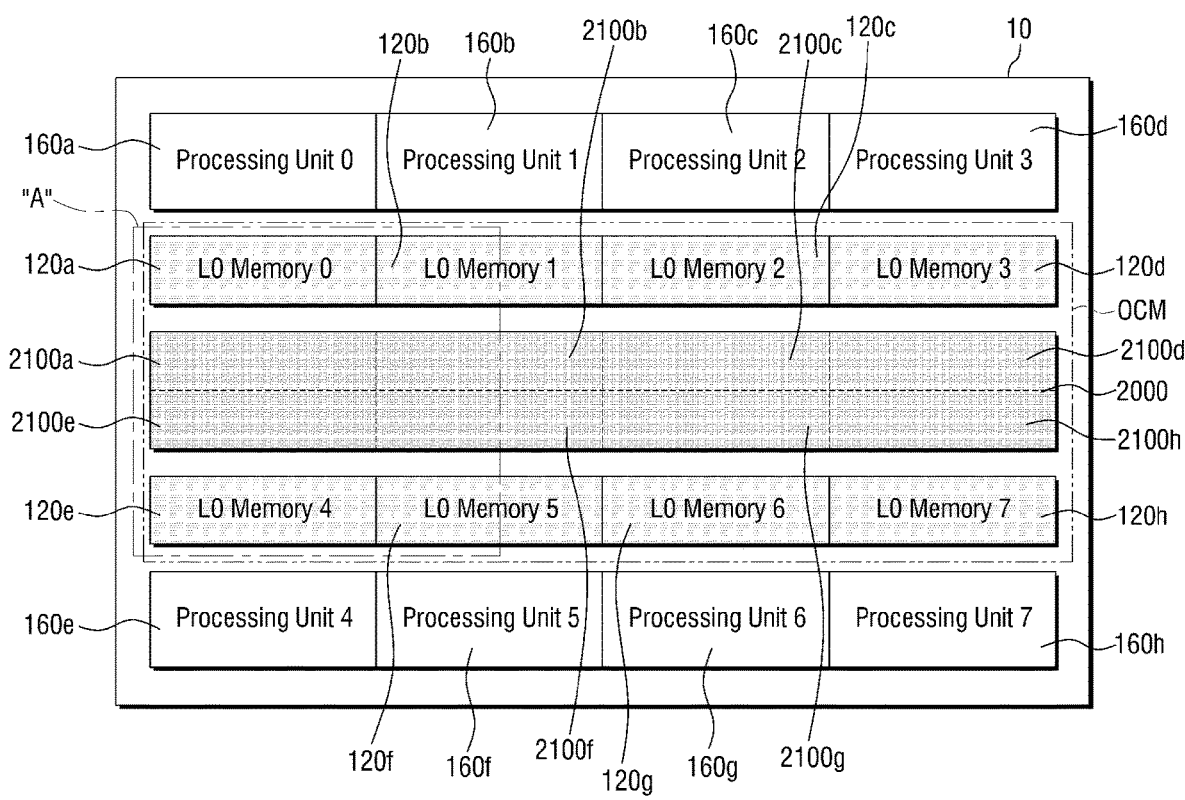
FIG. 13 is a block diagram for illustrating the memory reconstruction of the neural processing system of FIG. 1.

FIG. 13 is a block diagram for illustrating memory reconfiguration of a neural processing system in accordance with some embodiments of the disclosure.

Referring to FIG. 13, the neural core SoC 10 may include first to eighth processing units 160a to 160h and an on-chip memory OCM. Although FIG. 13 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 14:
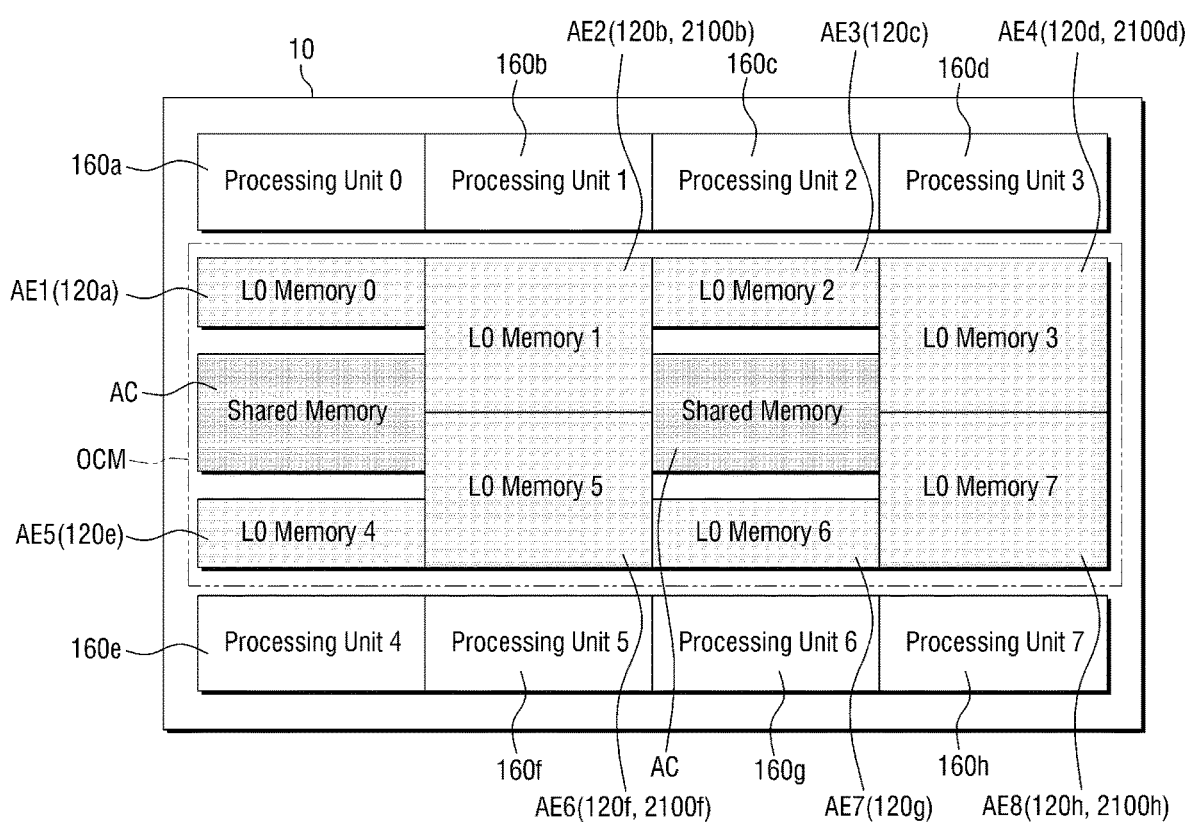
FIG. 14 is a block diagram showing an example of the memory reconstruction of the neural processing system of FIG. 1.

FIG. 14 is a block diagram showing an example of memory reconstruction of a neural processing system in accordance with some embodiments of the disclosure.

With reference to FIGS. 13 and 14, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 15:
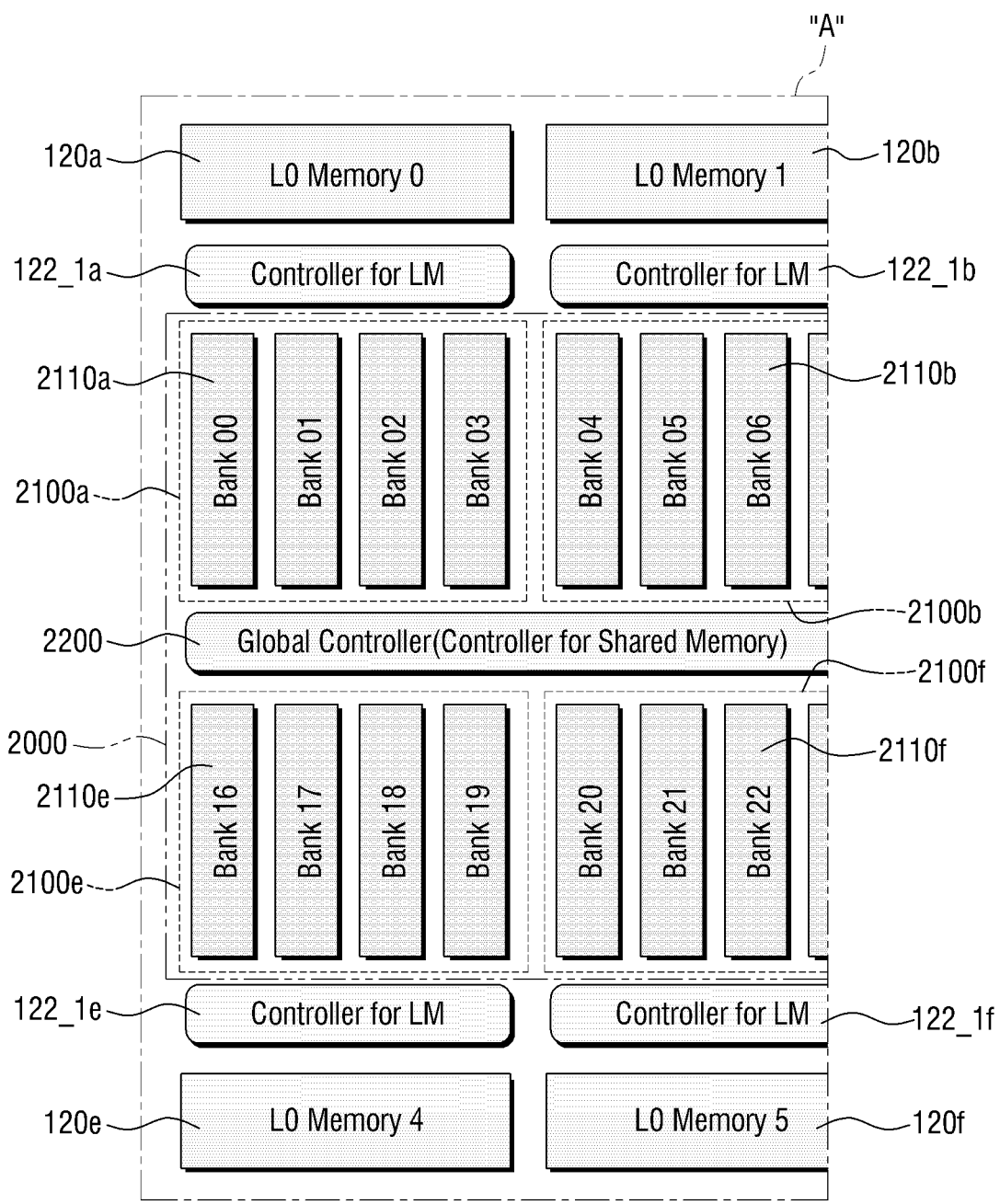
FIG. 15 is an enlarged block diagram of a portion A of FIG. 13.

FIG. 15 is an enlarged block diagram of a portion A of FIG. 13.

With reference to FIGS. 13 and 15, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, the first L0 memory controller 122_1a, the second L0 memory controller 122_1b, the fifth L0 memory controller 122_1e, the sixth L0 memory controller 122_1f, and the global controller 2200 may each be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 as shown and described in accordance with FIG. 3. The first to eighth memory units 2100a to 2100h may exchange data with an off-chip memory 30 as shown and described in accordance with FIG. 2 via the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be one or more areas obtained by dividing the first memory unit 2100a into certain sizes. The first memory banks 2110a may all be memory devices of the same size. However, the embodiment is not limited thereto. FIG. 15 shows that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 16:
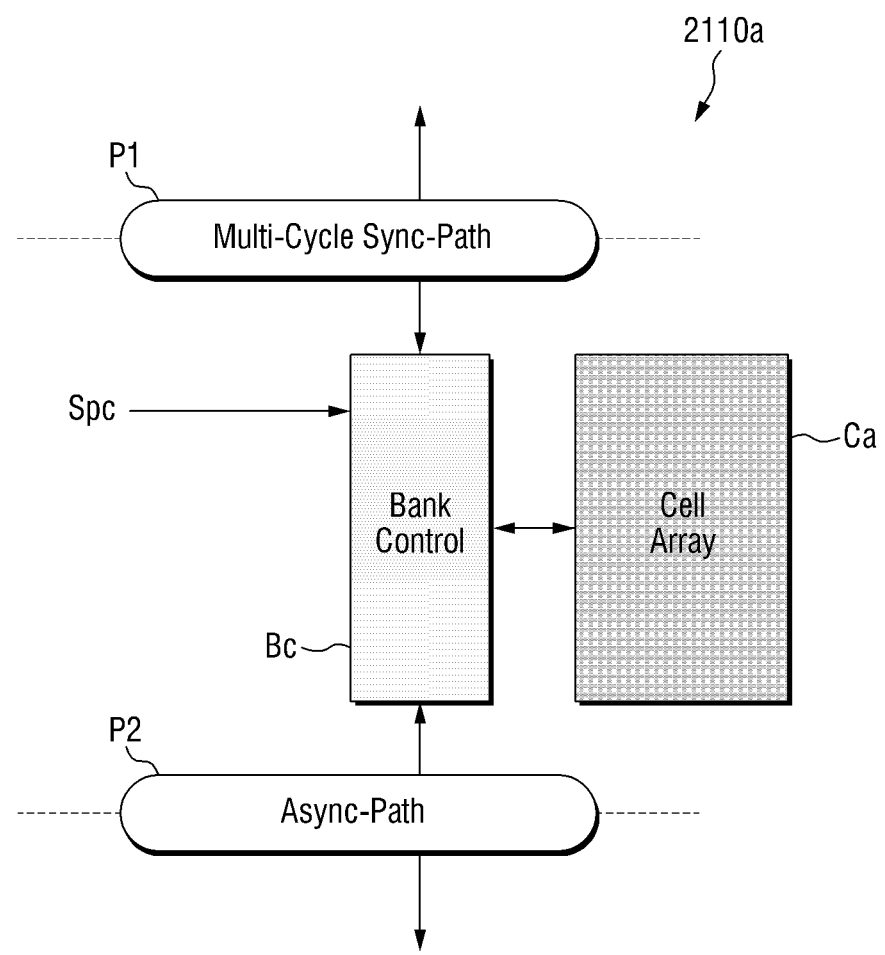
FIG. 16 is a diagram for illustrating the first memory bank of FIG. 15 in detail.

FIG. 16 is a diagram for illustrating the first memory bank of FIG. 15 in detail. Although FIG. 16 illustrates the first memory bank 2110a, other memory banks may also have the same structure as the first memory bank 2110a.

Referring to FIG. 16, the first memory bank 2110a may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, the bank controller Bc, the first path unit P1, and the second path unit P2 may each be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b, as shown in FIG. 15.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately. Thus, a delay of data transmission may not occur. Accordingly, faster and more efficient data exchange can be possible.

In the embodiment shown in FIG. 16, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 15.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 16, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In other words, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In other words, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 15 and FIG. 16, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100*b* exchanges data via the second path unit P2, the second address system may be used. In this case, the first address system and the third address system may be the same as each other. However, the embodiment is not limited thereto.

The first address system and the third address system may each be used exclusively for the first processing unit 160*a* and the second processing unit 160*b*, respectively. The second address system may be commonly applied to the first processing unit 160*a* and the second processing unit 160*b*.

In FIG. 16, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 17:
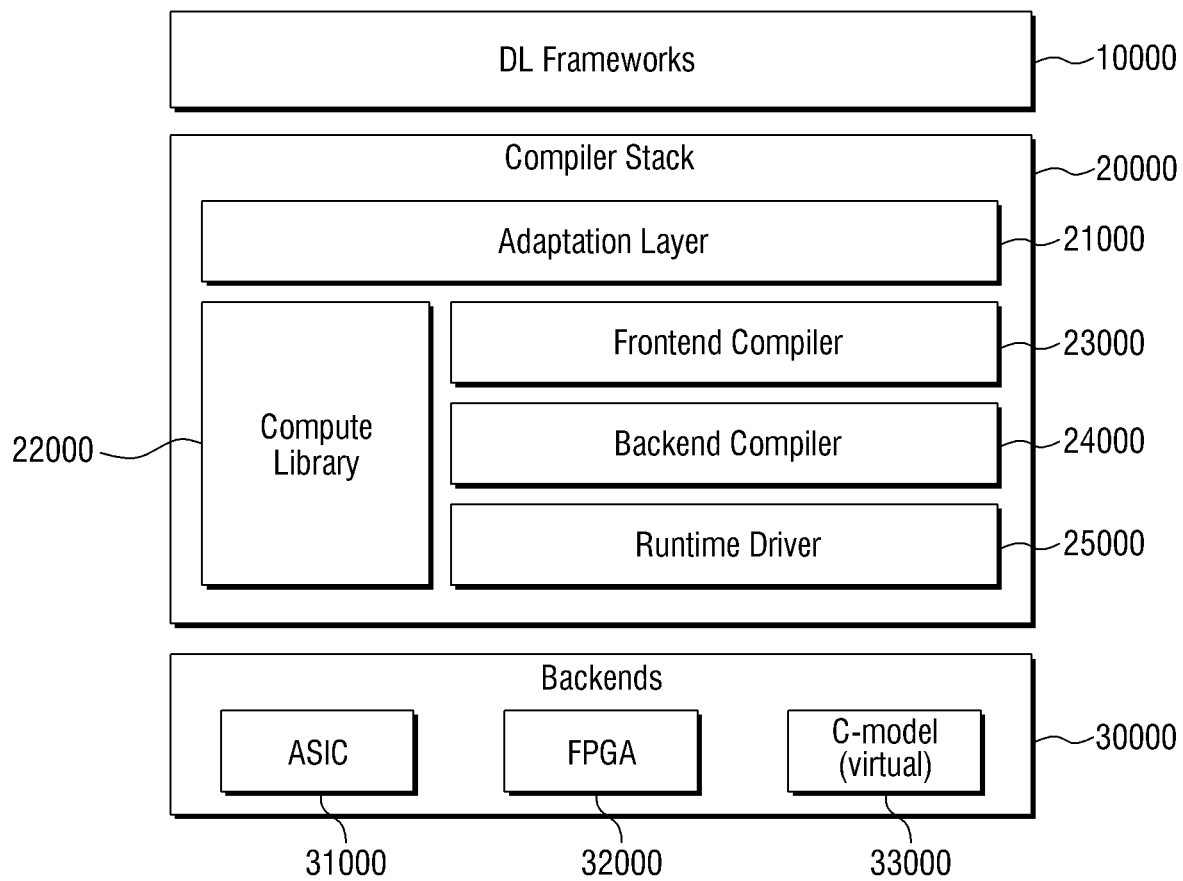
FIG. 17 is a block diagram for illustrating a software hierarchy of a neural processing device in accordance with some embodiments of the disclosure.

FIG. 17 is a block diagram for illustrating a software hierarchy of a neural processing device in accordance with some embodiments of the disclosure.

Referring to FIG. 17, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 18:
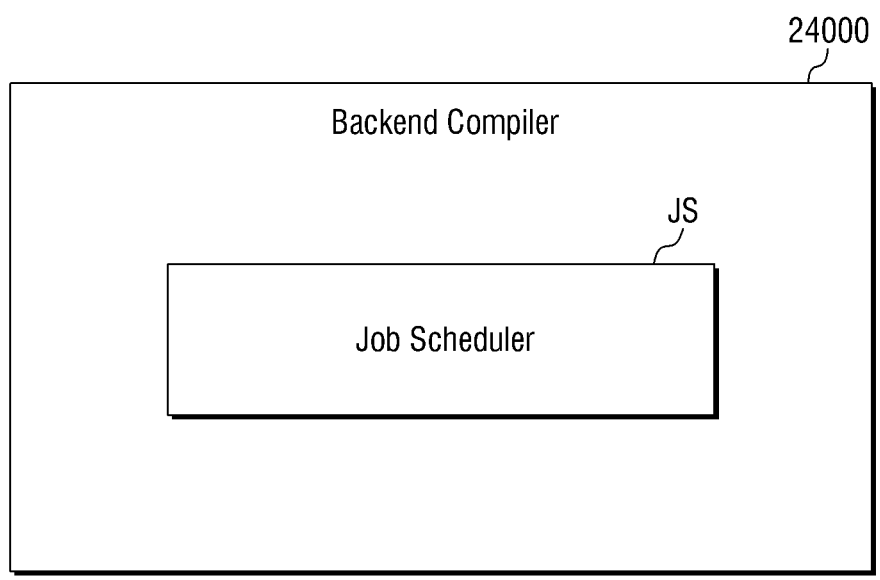
FIG. 18 is a diagram for illustrating the back-end compiler of FIG. 17 in detail.

FIG. 18 is a diagram for illustrating the back-end compiler of FIG. 17 in detail.

Referring to FIG. 18, the back-end compiler 24000 may include a job scheduler JS. The job scheduler JS may determine processing order and timing of jobs to be processed by an operating system of the neural processing device 1. Although the job scheduler JS may be implemented as software, the embodiment is not limited thereto. That is, the job scheduler JS may also be implemented as a hardware module. Further, the job scheduler JS may also be located in a layer other than the back-end compiler 24000. In this case, the job scheduler JS may be named a job scheduler circuit, but for the sake of convenience, the term is unified as a job scheduler. Moreover, the job scheduler JS may be implemented as a circuit or circuitry.

Figure 19:
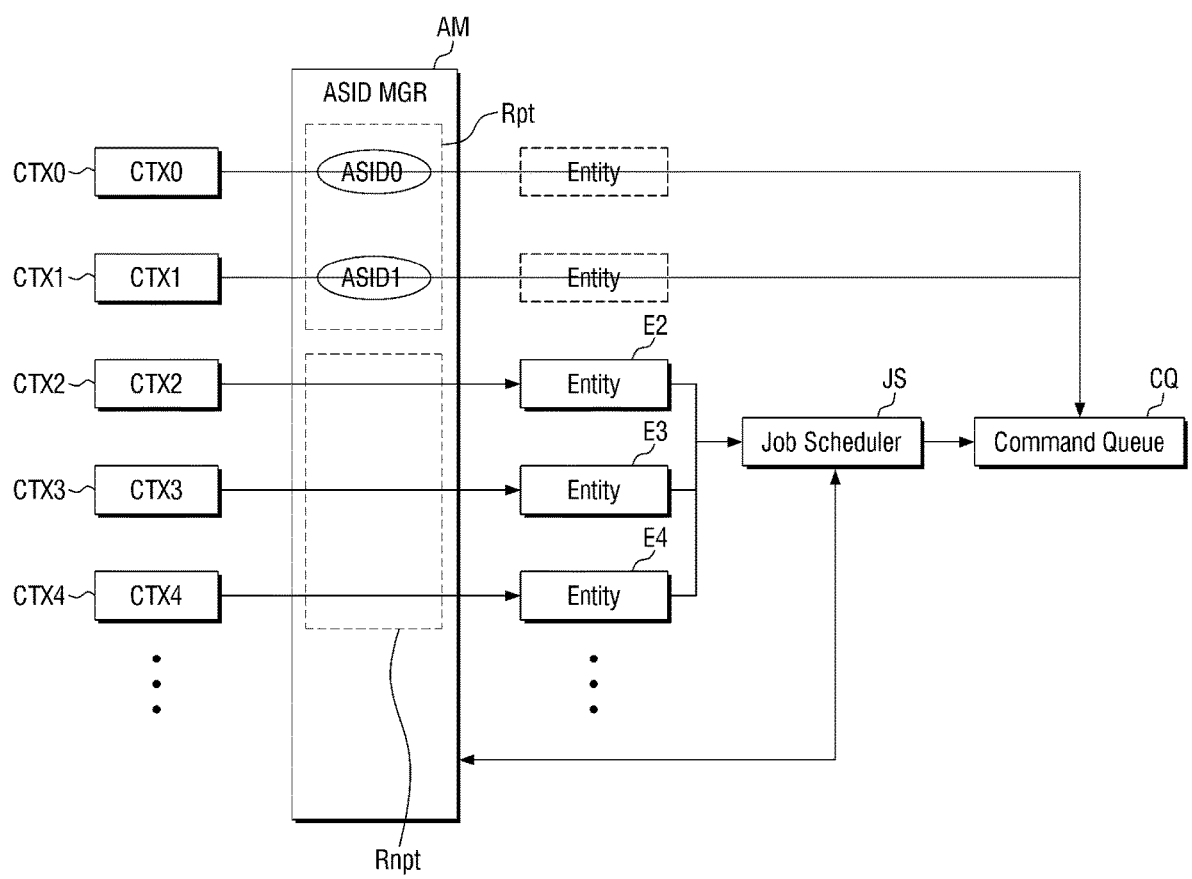
FIG. 19 is a conceptual diagram for illustrating pass-through and job scheduling of a neural processing device in accordance with some embodiments of the disclosure.

FIG. 19 is a conceptual diagram for illustrating pass-through and job scheduling of a neural processing device in accordance with some embodiments of the disclosure.

Referring to FIGS. 1 and 19, the neural processing device 1 in accordance with some embodiments of the disclosure may include an address space ID (ASID) manager AM, a plurality of entities E2, E3, E4, the job scheduler JS, and a command queue CQ. The ASID manager AM, the plurality of entities E2, E3, E4, and the command queue CQ may be respectively named as an ASID manager circuit, a plurality of entity circuits, and a command queue circuit, but for the sake of convenience, the terms are unified as the ASID manager, the plurality of entities, and the command queue. Further, the ASID manager AM, the plurality of entities E2, E3, E4, and the command queue CQ may each be implemented as a circuit or circuitry.

In this case, at least one context CTX0 to CTX4 may be executed by the neural processing device 1. The at least one context CTX0 to CTX4 may refer to a kind of programs executed by the neural processing device 1.

Although FIG. 19 shows, for example, five contexts CTX0 to CTX4, the embodiment is not limited thereto. In other words, the number of contexts can vary as desired. The at least one context CTX0 to CTX4 may include, for example, a first context CTX0, a second context CTX1, a third context CTX2, a fourth context CTX3, and a fifth context CTX4.

ASIDs may be managed via the ASID manager AM. ASIDs may exist in correspondence to a number of contexts that the neural processing device 1 can manage. That is, if the neural processing device 1 can manage only three contexts due to the limitations of the device, up to three ASIDs may exist. In contrast, since the number of contexts that can be managed by the software of the neural processing device 1, i.e., the operating system, is nearly infinite, a method of reducing a number that can be managed simultaneously by assigning ASIDs may be necessary to schedule these contexts.

The number of ASIDs may be determined according to hardware conditions such as a number of registers held by the neural processing device 1. Hereinafter, the embodiment will be described on the assumption that the number of ASIDs is two.

The ASID manager AM may receive ASID allocation requests from the at least one context CTX0 to CTX4, respectively. In this case, the ASID allocation requests may be received in sequence according to the time points at which jobs of the respective contexts are created.

The ASID manager AM may allocate at least one ASID to each context. In this case, the ASID manager AM may be a software module implemented by the neural processing device 1, but the embodiment is not limited thereto. Since the number of contexts may be greater than the number of ASIDs, there may be contexts to which ASIDs are allocated and contexts to which ASIDs are not allocated.

At this time, in the case of ASIDs that have already been allocated by other contexts, the ASIDs may be bound and not be allocated to new contexts. If binding of an ASID is ended, i.e., unbound, that ASID may be allocated to a new context.

In FIG. 19, by way of example, the first context CTX0 may be allocated a first ASID ASID0, and the second context CTX1 may be allocated a second ASID ASID1. The third context CTX2, the fourth context CTX3, and the fifth context CTX4 may not be allocated an ASID. The ASID manager AM may allocate the ASIDs in the order in which requests are received from each context. However, the embodiment is not limited thereto.

Depending on whether an ASID is allocated, each context may proceed to a pass-through route Rpt or a non-pass-through route Rnpt. That is, contexts that have been allocated an ASID may proceed to the pass-through route Rpt, and contexts that have not been allocated an ASID may proceed to the non-pass-through route Rnpt. In FIG. 19, the first context CTX0 and the second context CTX1 may proceed to the pass-through route Rpt, and the third context CTX2, the fourth context CTX3, and the fifth context CTX4 may proceed to the non-pass-through route Rnpt.

The pass-through route Rpt may proceed directly to the command queue CQ without going through the entities and the job scheduler JS. The command queue CQ may be a queue for the neural processing device 1 to execute jobs. The command queue CQ may receive jobs in sequence and store the jobs as standby jobs. The standby jobs stored in the command queue CQ may be executed in sequence by the neural processing device 1.

Figure 20:
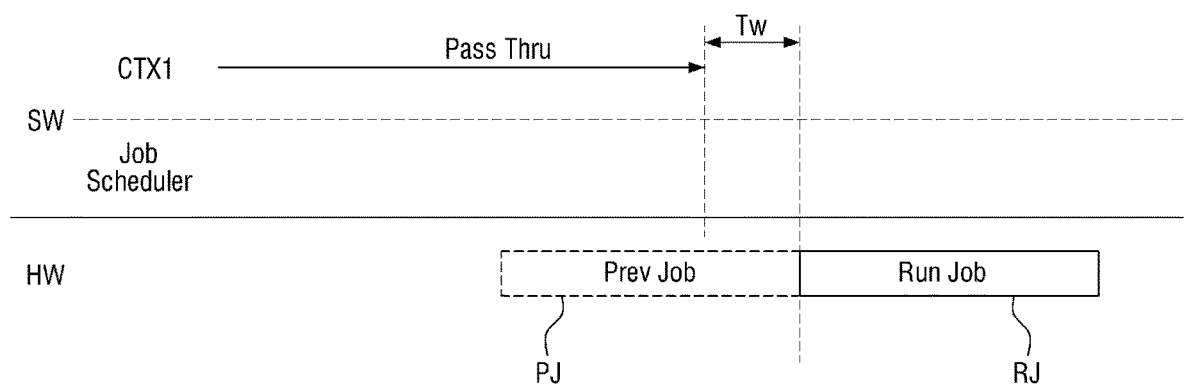
FIG. 20 is a conceptual diagram for illustrating job execution according to ASIDs of a neural processing device in accordance with some embodiments of the disclosure.

FIG. 20 is a conceptual diagram for illustrating job execution according to ASIDs of a neural processing device in accordance with some embodiments of the disclosure.

Referring to FIGS. 19 and 20, a latency that may occur when proceeding to the pass-through route Rpt can be found.

The second context CTX1 and the job scheduler JS may be arranged in the software domain SW. That is, the software domain SW may be an operating part implemented in software. The hardware domain HW may be an operating part implemented by actual physical hardware.

The second context CTX1 may have a pass-through authority in the software domain SW and transmit jobs directly to the command queue CQ. Accordingly, the job scheduler JS may not need to schedule jobs. Accordingly, a run job RJ can be executed immediately in the hardware domain HW (if there is no previous job PJ).

If there exists a previous job PJ, a latency by an amount of a waiting time Tw may occur until the previous job PJ ends. However, this waiting time Tw may not be an added overhead because it is not a latency due to job scheduling but an inevitable part of job execution.

Referring again to FIG. 19, in the case of proceeding to the non-pass-through route Rnpt, the third context CTX2, the fourth context CTX3, and the fifth context CTX4 may transmit and store jobs to the third entity E2, the fourth entity E3, and the fifth entity E4, respectively.

Entities may exist for each context. However, the embodiment is not limited thereto. The entities may be buffer memories that sequentially store the jobs of each context.

The job scheduler JS may schedule jobs of the third entity E2, the fourth entity E3, and the fifth entity E4. The job scheduler JS may schedule the jobs of the third entity E2, the fourth entity E3, and the fifth entity E4, and make sync requests requesting ASID allocation from the ASID manager AM pending in sequence. In this case, the sync requests for requesting ASID allocation from the ASID manager AM may be what is retrying allocation since a pass-through authority was not granted at the initial allocation request. A sync request may be transmitted for each context, and one or more jobs may be associated with one sync request. Each sync request may be a request for one context. The job scheduler JS may transmit each job to the command queue CQ once ASIDs are allocated according to the sync requests.

The command queue CQ may store both jobs transmitted from each context by the pass-through authority and jobs transmitted with ASIDs allocated by the job scheduler JS, and execute jobs in sequence.

Figure 21:
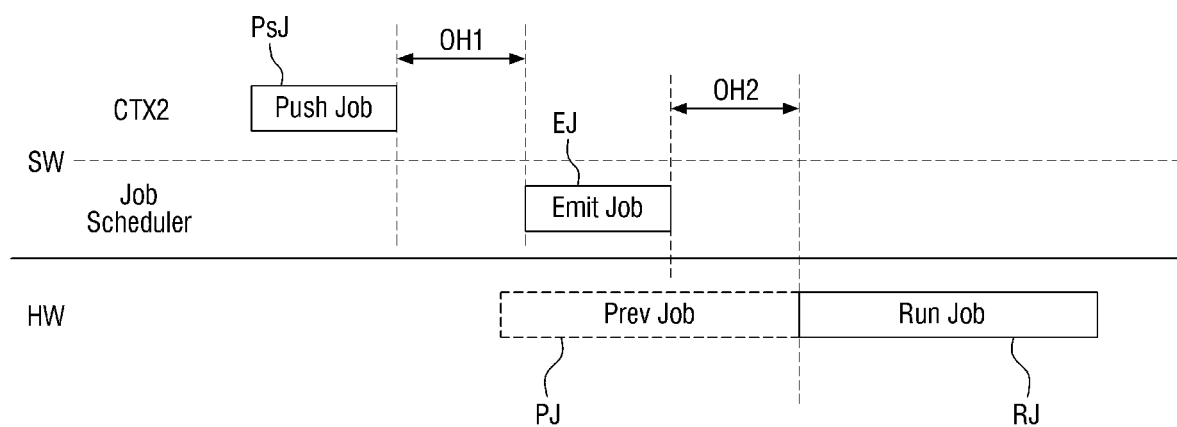
FIG. 21 is a conceptual diagram for illustrating job execution according to ASIDs of a neural processing device in accordance with some embodiments of the disclosure.

FIG. 21 is a conceptual diagram for illustrating job execution according to ASIDs of a neural processing device in accordance with some embodiments of the disclosure.

Referring to FIGS. 19 and 21, the third context CTX2 may not be allocated an ASID by the ASID manager AM and thus may not have a pass-through authority. Therefore, the job of the third context CTX2 may proceed to the non-pass-through route Rnpt by the job scheduler JS.

First, the third context CTX2 may perform a push job PsJ. The push job PsJ may mean that the third context CTX2 provides and stores the job to the third entity E2. The job scheduler JS may not be executed immediately at the end time point of the push job PsJ. In other words, there may arise a latency until the job scheduler JS is woken up by the push job PsJ. Accordingly, a first scheduling overhead OH1 may occur. That is, the first scheduling overhead OH1 may mean a latency for the job scheduler JS to take over the progress in the third context CTX2.

The job scheduler JS may perform an emit job EJ after the first scheduling overhead OH1 has passed. The emit job EJ may be a task of allocating an ASID to the third context CTX2 and providing the job to the command queue CQ. The hardware domain HW, i.e., the neural processing device 1 may not be executed immediately at the end time point of the emit job EJ. In other words, there may arise a latency until the neural processing device 1 is woken up by the emit job EJ. Accordingly, a second scheduling overhead OH2 may occur. That is, the second scheduling overhead OH2 may mean a latency for the neural processing device 1 to take over the progress in the job scheduler JS.

If the previous job PJ is in progress, a latency may occur due to the inevitable part of job execution, such as the waiting time Tw in FIG. 20, and accordingly, at least part of the second scheduling overhead OH2 may not be revealed. However, if the previous job PJ has already been completed, the second scheduling overhead OH2 may be revealed, and thus inefficiency may arise.

Therefore, the neural processing device 1 in accordance with some embodiments of the disclosure can grant pass-through authorities as many as the number of ASIDs held, and thus eliminate at least the first scheduling overhead OH1 or the second scheduling overhead OH2. Through this, it is possible to reduce the latency of job scheduling and maximize the performance and speed of the entire device.

Figure 22:
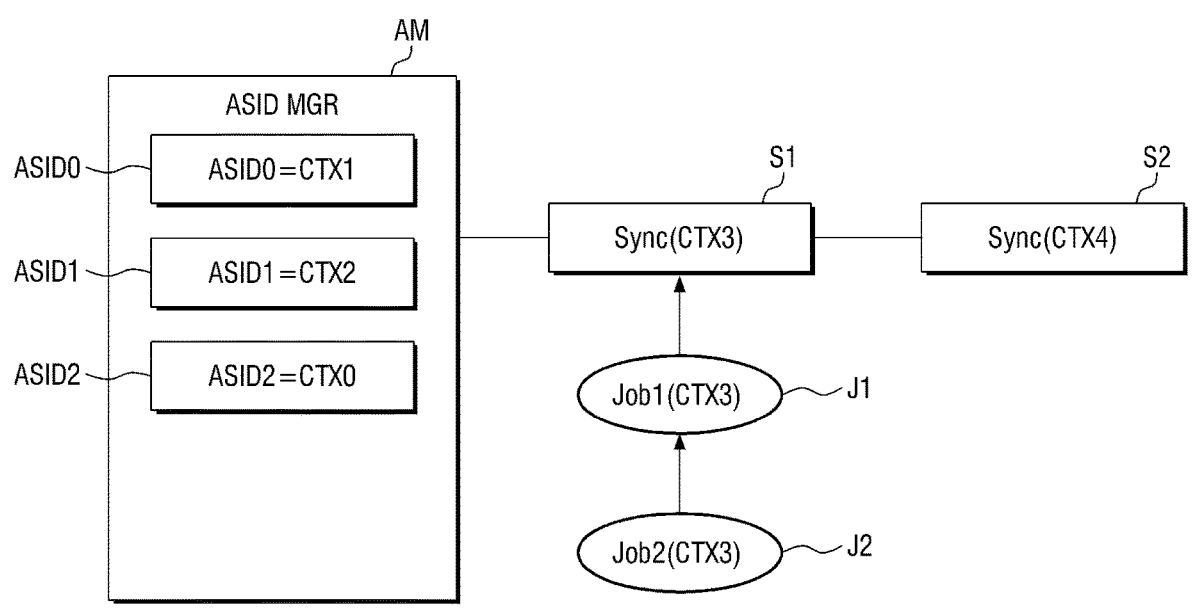
FIG. 22 is a conceptual diagram for illustrating ASID allocation of an ASID manager of a neural processing device in accordance with some embodiments of the disclosure.
Figure 23:
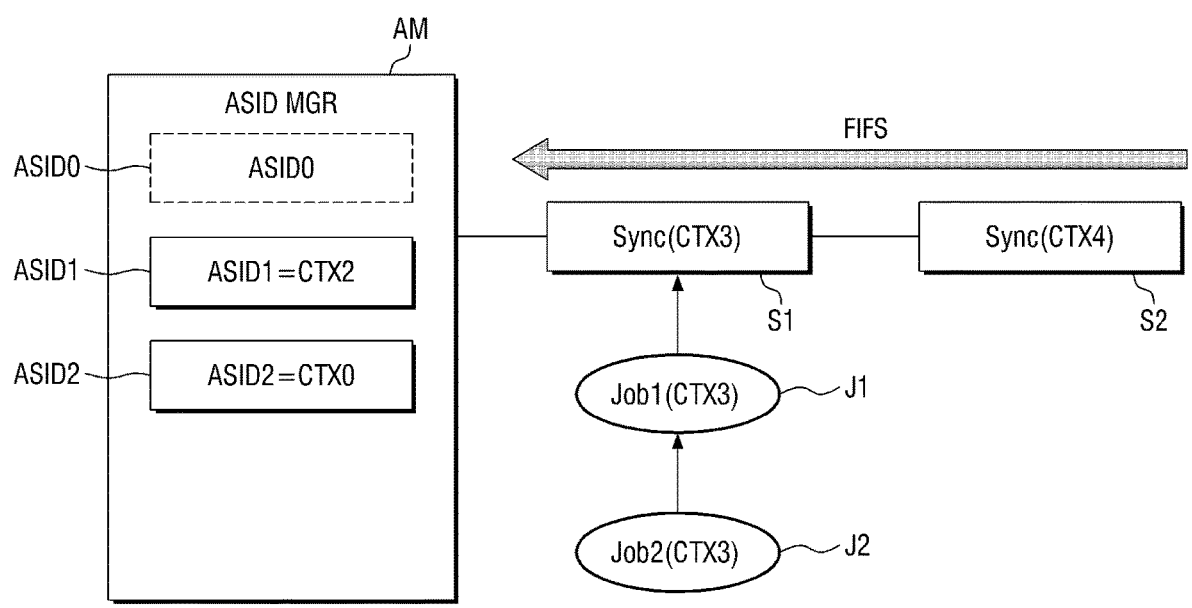
FIG. 23 is a conceptual diagram for illustrating unbinding ASID of a neural processing device in accordance with some embodiments of the disclosure.
Figure 24:
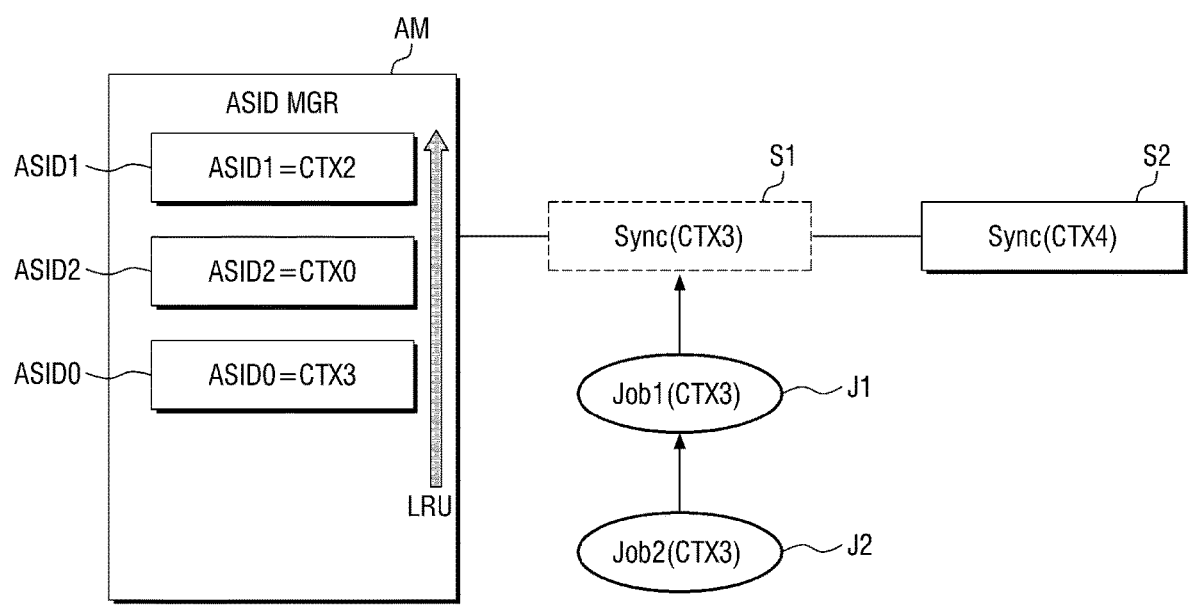
FIG. 24 is a conceptual diagram for illustrating allocation of an LRU ASID of a neural processing device in accordance with some embodiments of the disclosure.
Figure 25:
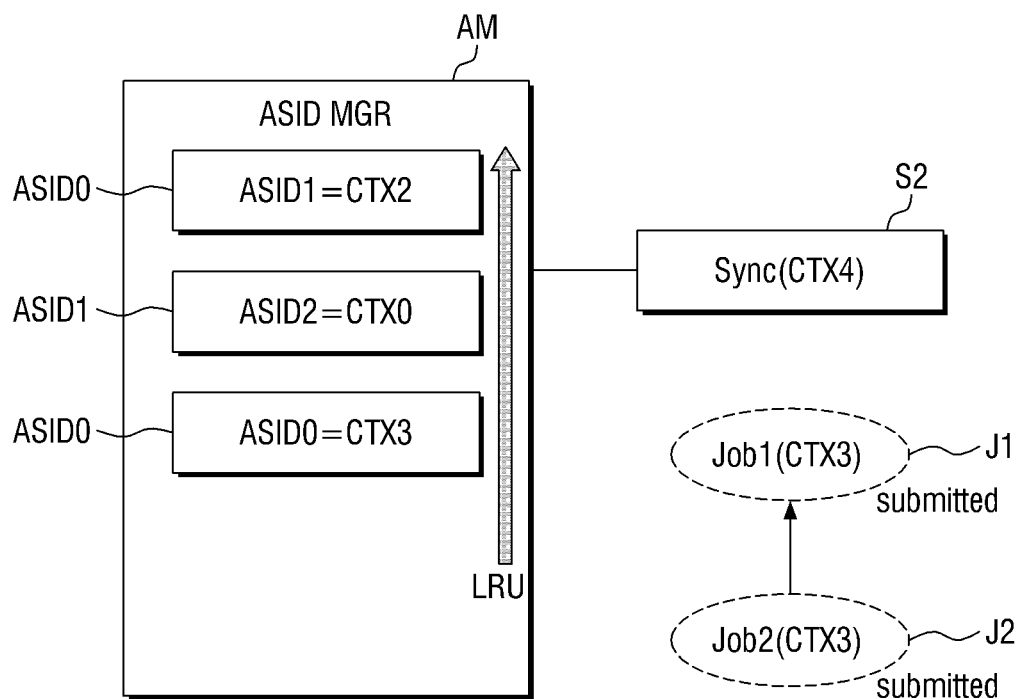
FIG. 25 is a conceptual diagram for illustrating allocation of an LRU ASID of a neural processing device in accordance with some embodiments of the disclosure.

FIG. 22 is a conceptual diagram for illustrating ASID allocation of an ASID manager of a neural processing device in accordance with some embodiments of the disclosure, and FIG. 23 is a conceptual diagram for illustrating ASID unbinding of a neural processing device in accordance with some embodiments of the disclosure. FIG. 24 is a conceptual diagram for illustrating allocation of an LRU ASID of a neural processing device in accordance with some embodiments of the disclosure, and FIG. 25 is a conceptual diagram for illustrating allocation of an LRU ASID of a neural processing device in accordance with some embodiments of the disclosure.

Referring to FIGS. 19 and 22, the ASID manager AM may manage three ASID IDs by way of example. That is, the ASID manager can manage the first ASID ASID0, the second ASID ASID1, and the third ASID ASID2.

The ASID manager AM may allocate the first ASID ASID0 to the second context CTX1 and the second ASID ASID1 to the third context CTX2. Further, the ASID manager AM may allocate the third ASID ASID2 to the first context CTX0.

The fourth context CTX3 and the fifth context CTX4 to which ASIDs have not been allocated may transmit a first sync request S1 and a second sync request S2 to the ASID manager AM, respectively. At this time, the first sync request S1 and the second sync request S2 may be transmitted in sequence by the job scheduler JS. That is, the first sync request S1 may be received by the ASID manager AM before the second sync request S2.

At this time, the jobs performed by the fourth context CTX3 may be one or more. That is, a first job J1 and a second job J2 may be requested by the fourth context CTX3 to be processed.

Referring to FIGS. 19 and 23, the first ASID ASID0 bound (or, allocated) to the third context CTX2 may be unbound again once all jobs of the third context CTX2 are processed. Accordingly, the first ASID ASID0 may be in a state of being not connected to any context, i.e., an unbound ASID.

The ASID manager AM may allocate the unbound ASID according to sync requests on standby. At this time, an order of allocation may be processed according to the input order by the FIFS (first in first served) method. That is, in FIG. 23, the fourth context CTX3 of the first sync request S1 may be allocated an ASID first, and then the fifth context CTX4 of the second sync request S2 may be allocated an ASID.

Referring to FIGS. 19, 24, and 25, the ASID manager AM may select unbound ASIDs and choose the least recently used (LRU) ASID among the unbound ASIDs. The LRU ASID may be the oldest previously used ASID. However, the embodiment is not limited thereto.

The embodiment performs the allocation of ASIDs by the LRU method, and thus can prevent bias in the allocation of particular ASIDs and perform uniform use. Through this, the hardware associated with the ASIDs can be used uniformly.

In addition, when the ASID allocation is performed by the LRU method, it is possible to increase a probability that the same ASID is allocated to the same context again. If the same ASID is allocated to the same context again, the task can be performed more efficiently.

In FIGS. 24 and 25, by way of example, the first ASID ASID0 may be allocated to the fourth context CTX3 as the LRU ASID. The first job J1 and the second job J2 of the fourth context CTX3 may be transmitted to the command queue CQ by the job scheduler JS.

The first job J1 and the second job J2 of the fourth context CTX3 may be submitted to the command queue CQ by the job scheduler JS. Accordingly, the fourth context CTX3 may disappear from the current pending list, and only the second sync request S2 of the fifth context CTX4 may be pending.

Figure 26:
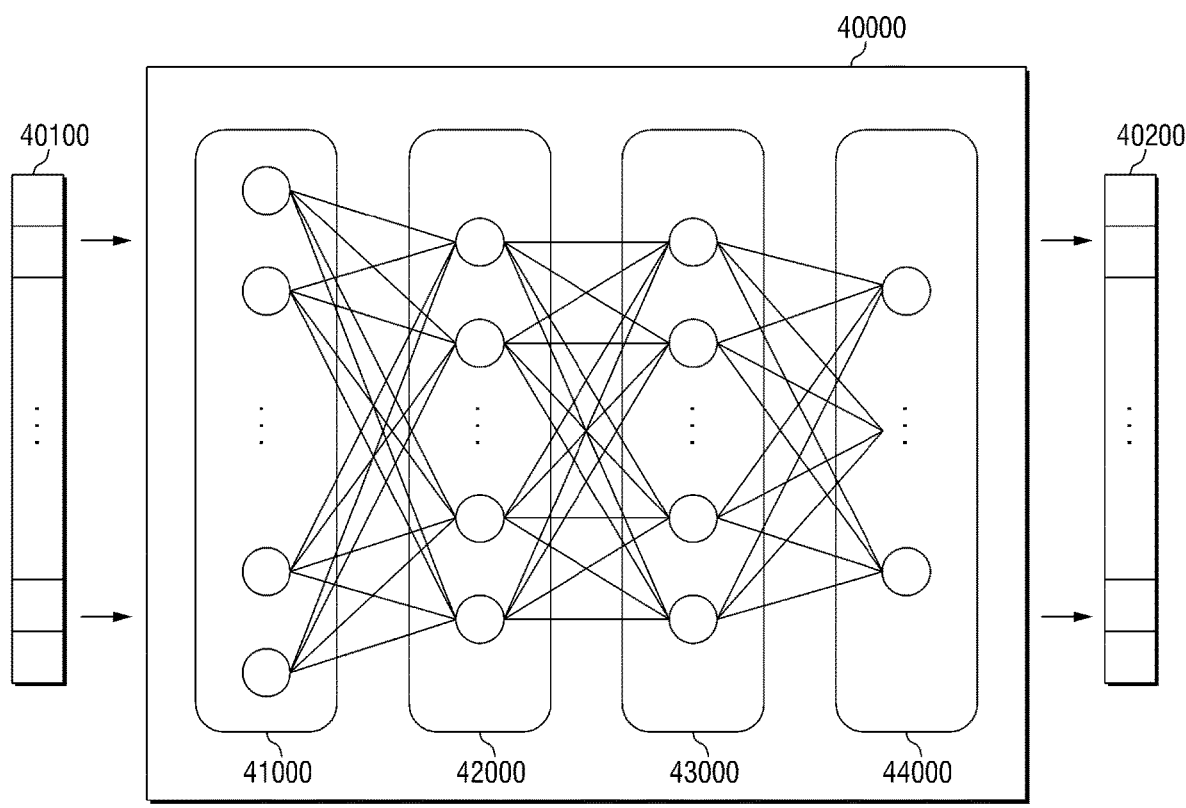
FIG. 26 is a conceptual diagram for illustrating deep learning calculations performed by a neural processing device in accordance with some embodiments of the disclosure.

FIG. 26 is a conceptual diagram for illustrating deep learning calculations performed by a neural processing device in accordance with some embodiments of the disclosure.

Referring to FIG. 26, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

Figure 29:
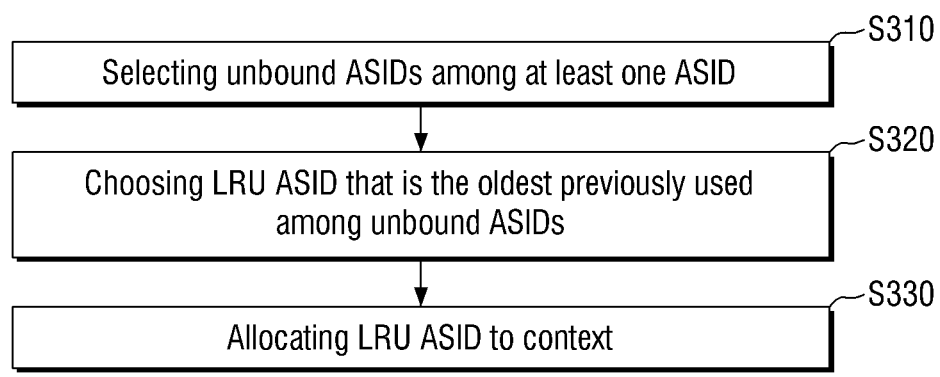
FIG. 29 is a flowchart for illustrating allocating the ASIDs of FIG. 28 in detail.

The artificial neural network model 40000 may be implemented by a multilayer perceptron (MLP) including multi-layer nodes and connections between them. An artificial neural network model 40000 in accordance with the embodiment may be implemented using one of various artificial neural network model structures including the MLP. As shown in FIG. 29, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 27:
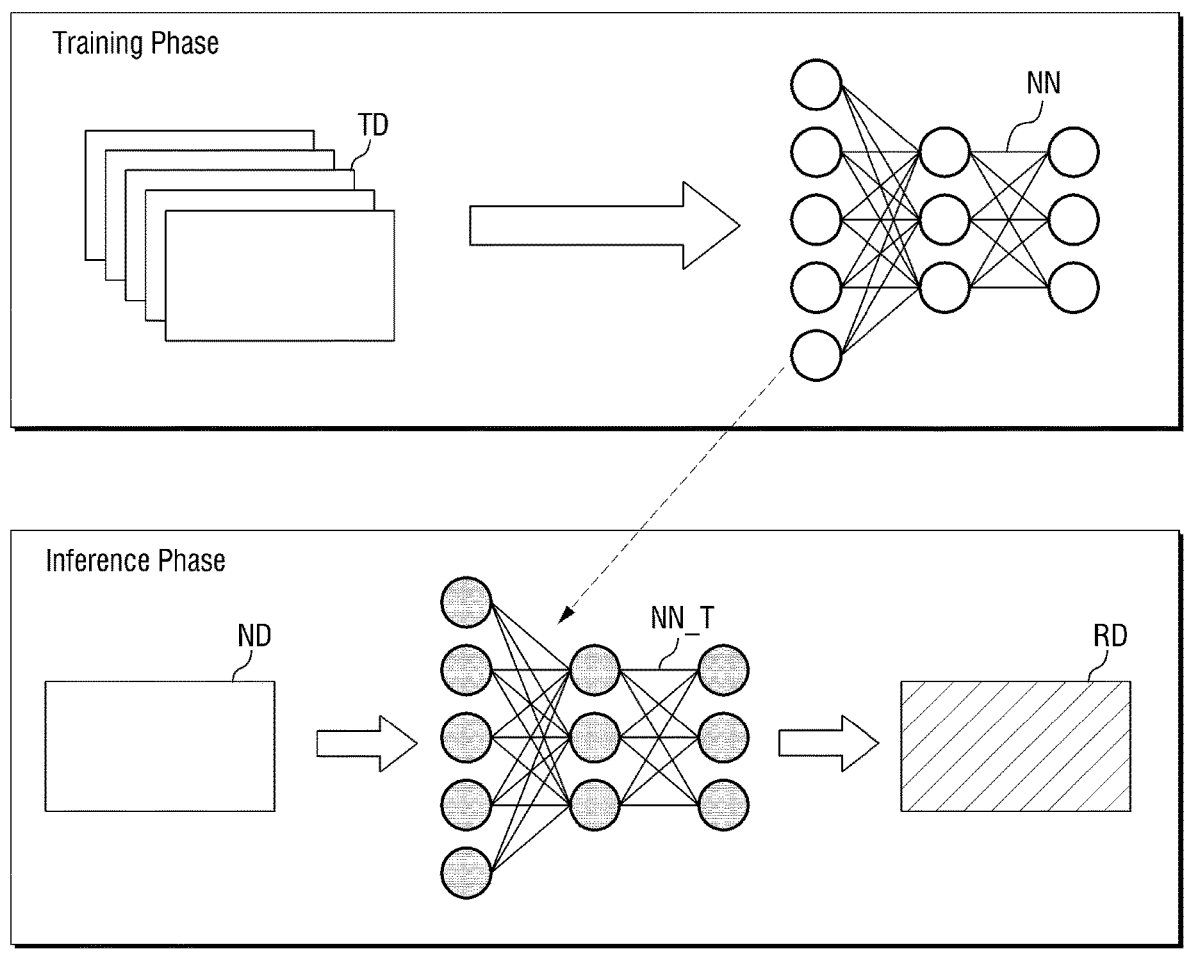
FIG. 27 is a conceptual diagram for illustrating training and inference operations of a neural network of a neural processing device in accordance with some embodiments of the disclosure.

FIG. 27 is a conceptual diagram for illustrating training and inference operations of a neural network of a neural processing device in accordance with some embodiments of the disclosure.

Referring to FIG. 27, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a method for job scheduling of a neural processing device in accordance with some embodiments of the disclosure will be described with reference to FIGS. 19, 28, and 29. Any description overlapping with the embodiments described above will be omitted or simplified.

Figure 28:
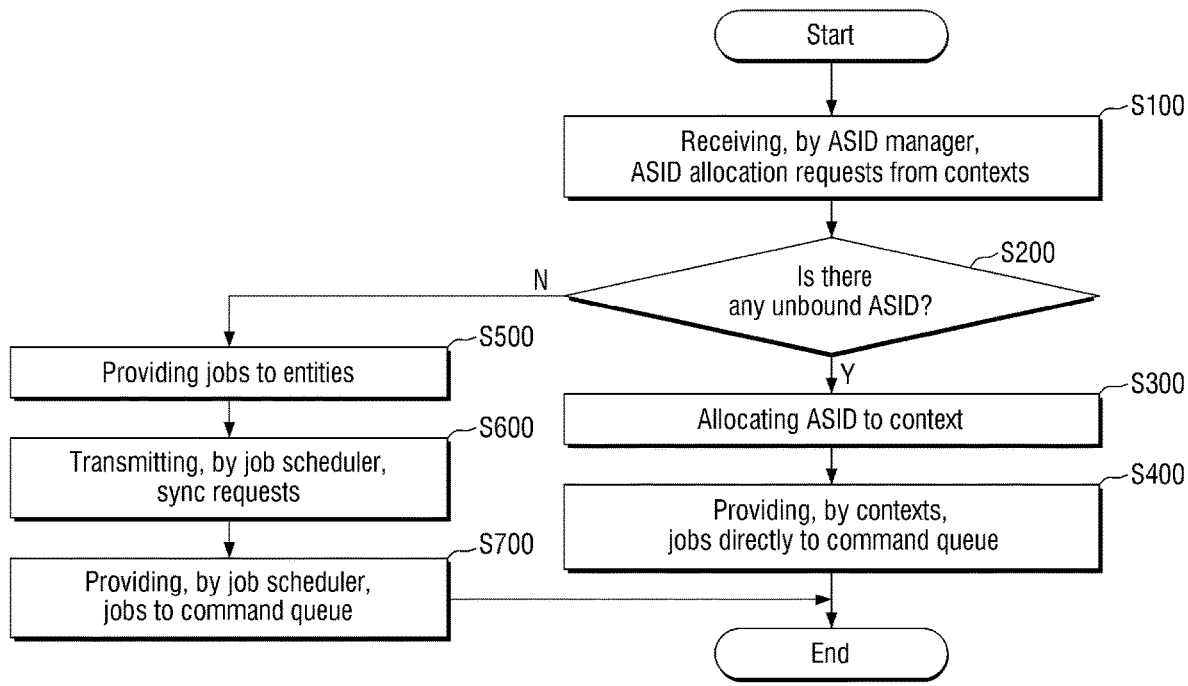
FIG. 28 is a flowchart for illustrating a method for job scheduling of a neural processing device in accordance with some embodiments of the disclosure.

FIG. 28 is a flowchart for illustrating a method for job scheduling of a neural processing device in accordance with some embodiments of the disclosure.

Referring to FIG. 28, the ASID manager receives ASID allocation requests from contexts at S100.

Specifically, referring to FIG. 19, the ASID manager AM may receive ASID allocation requests from at least one context CTX0 to CTX4, respectively. In this case, the ASID allocation requests may be received in sequence according to the time points at which jobs of the respective contexts are created.

Referring again to FIG. 28, the ASID manager may determine whether there is any unbound ASID at S200. If there is an unbound ASID, the ASID is allocated to one of the at least one context at S300.

Specifically, referring to FIG. 19, the ASID manager AM may allocate at least one ASID to each context. At this time, in the case of ASIDs that have already been allocated to other contexts, the ASIDs may be bound and not be allocated to new contexts. If binding of an ASID is ended, i.e., unbound, that ASID may be allocated to a new context.

Depending on whether an ASID is allocated, each context may proceed to a pass-through route Rpt or a non-pass-through route Rnpt. Contexts that have been allocated an ASID may proceed to the pass-through route Rpt.

Referring again to FIG. 28, the contexts provide jobs directly to the command queue at S400.

Specifically, referring to FIG. 19, the pass-through route Rpt may proceed directly to the command queue CQ without going through the entities and the job scheduler JS. The command queue CQ may be a queue for the neural processing device 1 to execute jobs. The command queue CQ may receive in sequence and store jobs. The jobs stored in the command queue CQ may be executed in sequence by the neural processing device 1.

Referring again to FIG. 28, if there is no unbound ASID in S200, jobs are provided to entities at S500.

Specifically, referring to FIG. 19, in the case of proceeding to the non-pass-through route Rnpt, the respective contexts may provide jobs to entities corresponding to themselves. Entities may exist for each context. However, the embodiment is not limited thereto. The entities may be buffer memories that sequentially store the jobs of each context.

Referring again to FIG. 28, the job scheduler transmits sync requests at S600.

Specifically, referring to FIG. 19, the job scheduler JS may schedule jobs of the third entity E2, the fourth entity E3, and the fifth entity E4. The job scheduler JS may schedule the jobs of the third entity E2, the fourth entity E3, and the fifth entity E4, and make sync requests requesting ASID allocation to the ASID manager AM pending in sequence. A sync request may be transmitted for each context, and one or more jobs may be associated with one sync request. Each sync request may be a request for one context.

Referring again to FIG. 28, the job scheduler provides jobs to the command queue at S700.

Specifically, referring to FIG. 19, the job scheduler JS may transmit each job to the command queue CQ once ASIDs are allocated according to the sync requests.

FIG. 29 is a flowchart for illustrating allocating the ASIDs of FIG. 28 in detail.

Referring to FIG. 29, unbound ASIDs are selected among at least one ASID at S310.

Specifically, referring to FIGS. 19 and 23, the first ASID ASID0 bound (allocated) to the third context CTX2 may be unbound again once all jobs of the third context CTX2 are processed. Accordingly, the first ASID ASID0 may be in a state of being not connected to any context, i.e., an unbound ASID. The ASID manager AM can select unbound ASIDs.

Referring again to FIG. 29, an LRU ASID that is the oldest previously used is chosen among the unbound ASIDs at S320.

Specifically, referring to FIGS. 19 and 24, the ASID manager AM may select unbound ASIDs and choose the LRU ASID among the unbound ASIDs. The LRU ASID may be the oldest previously used ASID. However, the embodiment is not limited thereto.

Referring again to FIG. 29, the LRU ASID is allocated to a context at S330.

Specifically, referring to FIGS. 19 and 24, the first ASID ASID0 may be allocated to the fourth context CTX3 as the LRU ASID. The first job J1 and the second job J2 of the fourth context CTX3 may be transmitted to the command queue CQ by the job scheduler JS.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A neural processing device including circuitry configured to cause:
   managing address space IDs (ASID), wherein a number of the ASIDs is predetermined;
   determining times of allocating the ASIDs for each of a plurality of contexts;
   providing a first scheduling path or a second scheduling path for each of the plurality of contexts; and
   consecutively receiving and executing jobs of a set of the plurality of contexts to which the ASIDs are allocated among the plurality of contexts,
   wherein a first set of the plurality of contexts are provided the first scheduling path by being allocated the ASIDs at a first time, and
   a second set of the plurality of contexts are provided the second scheduling path by being allocated the ASIDs at a second time.

2. The neural processing device of claim 1, wherein a number of the first set of the plurality of contexts are same as the predetermined number of the ASIDs.

3. The neural processing device of claim 1, wherein the circuitry is further configured to cause:
   receiving ASID allocation requests from the plurality of contexts; and
   determining the first set of the plurality of contexts to which the first scheduling path is provided among the plurality of contexts.

4. The neural processing device of claim 3, wherein the circuitry is further configured to cause:
   receiving the ASID allocation requests consecutively from the plurality of contexts according to times of generating jobs for each of the plurality of contexts; and
   determining the first set of the plurality of contexts to which the first scheduling path is provided according to an order of receiving the ASID allocation requests.

5. The neural processing device of claim 1, wherein the first set of the plurality of contexts comprises a first context that performs a first job, and
   the second set of the plurality of contexts comprises a second context that performs a second job.

6. The neural processing device of claim 5, wherein the circuitry is further configured to cause:
   unbinding an ASID allocated to the first context; and
   allocating the unbound ASID to the second context at the second time.

7. The neural processing device of claim 6, wherein the circuitry is further configured to cause:
   unbinding the ASID allocated to the first context when the first job is executed.

8. The neural processing device of claim 6, wherein the circuitry is further configured to cause:
   allocating a least recently used (LRU) ASID among unbound ASIDs to the second context when there exist a plurality of unbound ASIDs.

9. The neural processing device of claim 5, wherein the circuitry is further configured to cause:
   storing the second job of the second context; and
   scheduling an order of the second job stored, and providing the second scheduling path to the second job at the second time,
   wherein scheduling the order comprises:
     pushing the second job to be stored;
     emitting the second job to be provided to a command queue; and
     executing the second job.

10. The neural processing device of claim 9, wherein a first scheduling overhead exists between a time the second job is pushed and a time the second job is emitted.

11. The neural processing device of claim 10, wherein a second scheduling overhead exists between the time the second job is emitted and a time the second job is executed.

12. The neural processing device of claim 9, wherein the first context is executed without scheduling overhead.

13. A method for job scheduling of a neural processing device, comprising:
   receiving, by address space ID (ASID) manager circuitry, an ASID allocation request from a first context;
   determining, by the ASID manager circuitry, whether there is any unbound ASID among ASIDs;
   in response to a determination that there is an unbound ASID, allocating the unbound ASID to the first context; and
   providing, by the first context, a first job to be executed by the first context directly to a command queue.

14. The method for job scheduling of the neural processing device of claim 13, further comprising in response to a determination that there is no unbound ASID:
   providing, by the first context, the first job to a first entity;
   allocating, by job scheduler circuitry, an ASID to the first context via the ASID manager; and
   providing, by the job scheduler circuitry, the first job to the command queue via the ASID.

15. The method for job scheduling of the neural processing device of claim 14, further comprising executing, by the neural processing device, the first job provided to the command queue.

16. The method for job scheduling of the neural processing device of claim 15, wherein the neural processing device comprises at least one neural processor and a shared memory shared by the at least one neural processor.

17. The method for job scheduling of the neural processing device of claim 13, wherein allocating the unbound ASID comprises:
   selecting unbound ASIDs among the ASIDs;
   choosing a least recently used (LRU) ASID that is an oldest previously used among the unbound ASIDs; and
   allocating the LRU ASID to the first context.

18. The method for job scheduling of the neural processing device of claim 17, wherein allocating the unbound ASID further comprises job scheduler circuitry sequentially allocating the ASIDs.

19. A method for job scheduling of a neural processing device including circuitry configured to managing address space IDs (ASID) of a predetermined number, comprising:
   receiving ASID allocation requests from a plurality of contexts;
   providing a first scheduling path or a second scheduling path to each of the plurality of contexts by determining times of allocating the ASIDs for each of the plurality of contexts; and executing jobs of contexts of which the ASIDs are allocated among the plurality of contexts,
wherein providing the first scheduling path or the second scheduling path comprises:
provided the first scheduling path to a first set of the plurality of contexts at a first time; and
providing the second scheduling path to a second set of the plurality of contexts at a second time later than the first time in time series.

20. The method for job scheduling of the neural processing device of claim 19, wherein providing the first scheduling path to the first set of the plurality of contexts comprises:
receiving the ASID allocation requests from the plurality of contexts; and
determining the first set of the plurality of contexts to be provided the first scheduling path among the plurality of contexts from which the ASID allocation requests are received.

* * * * *